(12) United States Patent
Meijer et al.

(10) Patent No.: US 7,774,376 B1
(45) Date of Patent: Aug. 10, 2010

(54) TYPE-SYSTEM EXTENSIONS FOR OBJECT-ORIENTED LANGUAGE BASED ON COERCIVE SUBTYPING WITH RESTRICTIONS

(75) Inventors: Henricus Johannes Maria Meijer, Mercer Island, WA (US); Wolfram Schulte, Bellevue, WA (US); Gavin Bierman, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 10/909,060

(22) Filed: Jul. 30, 2004

(51) Int. Cl.
*G06F 17/20* (2006.01)
*G06F 15/16* (2006.01)

(52) U.S. Cl. ..................... 707/802; 707/803
(58) Field of Classification Search ............. 707/802, 707/803
See application file for complete search history.

(56) References Cited

U.S. PATENT DOCUMENTS

| | | | |
|---|---|---|---|
| 5,446,885 A | 8/1995 | Moore et al. | |
| 5,495,603 A | 2/1996 | Fruchtman et al. | |
| 5,630,127 A | 5/1997 | Moore et al. | |
| 5,917,489 A | 6/1999 | Thurlow et al. | |
| 6,142,684 A * | 11/2000 | Kirshenbaum et al. | 717/143 |
| 6,272,521 B1 * | 8/2001 | Jablonski et al. | 709/200 |
| 6,292,937 B1 * | 9/2001 | Sakata et al. | 717/116 |
| 6,341,369 B1 | 1/2002 | Degenaro et al. | |
| 6,407,753 B1 | 6/2002 | Budinsky et al. | |
| 6,519,597 B1 | 2/2003 | Cheng et al. | |
| 6,633,889 B2 | 10/2003 | Dessloch et al. | |
| 6,636,845 B2 | 10/2003 | Chau et al. | |
| 6,643,633 B2 | 11/2003 | Chau et al. | |
| 6,965,889 B2 | 11/2005 | Serrano-Morales et al. | |
| 6,976,020 B2 | 12/2005 | Anthony et al. | |
| 2004/0143604 A1 * | 7/2004 | Glenner et al. | 707/200 |
| 2004/0193575 A1 | 9/2004 | Chen et al. | |
| 2004/0216086 A1 | 10/2004 | Bau | |
| 2005/0060281 A1 | 3/2005 | Bucher et al. | |
| 2005/0222996 A1 | 10/2005 | Yalamanchi | |
| 2005/0246304 A1 | 11/2005 | Knight et al. | |
| 2005/0246686 A1 | 11/2005 | Seshadri | |

OTHER PUBLICATIONS

Chamberlin, XQuery: An XML query language; Aug. 16, 2002; pp. 597-615.*
Erik Meijer and Wolfram Schulte; XML Types for C#; 2001; pp. 1-23.*
Reeuwijk et al, Adding Tuples to Java: a Study in Lightweight Data Structures; Published Nov. 2002; pp. 185-191.*
Y. Leontiev, M.T. Ozsu, and D. Szafron. On Type Systems for Object-Oriented Database Programming Languages. ACM Computing Surveys, vol. 34 Issue 4, pp. 409-449, 2002.
XQuery 1.0: An XML Query Language. W3C. working draft Jul. 23, 2004. 207 pages. http://www.w3.org/TR/xquery/.

(Continued)

*Primary Examiner*—John E Breene
*Assistant Examiner*—Alex Gofman
(74) *Attorney, Agent, or Firm*—Workman Nydegger

(57) ABSTRACT

A type system that facilitates seamless integration of data access to relational and semi-structured data in an object oriented host language. A data access component includes the type system and corresponding set of syntax constructions that facilitates coercive subtyping and restricts covariance to identity conversions.

18 Claims, 11 Drawing Sheets

OTHER PUBLICATIONS

The Xtatic Project: Native XML Processing for C#. Last Viewed on Aug. 12, 2004. 1 page. http://www.cis.upenn.edu/~bcplerce/xtatic/.

XDuce: A Typed XML Processing Language. Last Viewed on Aug. 12, 2004. 1 page. http://xduce.sourceforge.net/.

Buchi, et al., "Compound Types for Java", Aug. 1998, ACM, pp. 362-373.

G. Kapel, B. Proll, S. Rausch-Schott, and W. Retschitzegger. TriGSflow—Active ObjectOriented Workflow Management System. In Proc. of the 28th Hawaii International Conference on System Sciences, pp. 727-736, 1995.

B. Grosof and T. Poon. Representing Agent Contracts with Exceptions using XML Rules, Ontologies, and Process Descriptions. In Rule Markup Languages for Business Rules on the Semantic Web, Jun. 2002. 22 pages.

F. Hayes-Roth. Rule-based Systems. Communications of the ACM, vol. 28 Issue 9, pp. 921-932, 1985.

J. Eisenstein and A. Puerta. Adaptation in Automated User-interface Design. Proceedings of the 5th International Conference on Intelligent User Interfaces, pp. 74-81, 2000.

Thomas Rizzo, WinFS 101: Introducing the New Windows File System, http://msdn.microsoft.com/library/en-us/ dnwinfs/html/winfs03112004.asp?frame=true, Mar. 17, 2004, 5 pages, Last viewed on Aug. 23, 2004.

Shawn Wildermuth, A Developer's Perspective on WinFS: Part 1, http://msdn.microsoft.com/library/en-us/dnlong/ html/winfsdevpersp.asp?frame=true, Mar. 2004, 12 pages, Last viewed on Aug. 23, 2004.

International Search Report for PCT Application No. US04/24719 dated Sep. 21, 2007, 3 pgs.

Brian Yeh. Exporting Software and the Extraterritorial Reach of U.S. Patent Law: *Microsoft Corp.* v. *AT&T Corp.* CRS Report for Congress, May 31, 2007. Order Code RS22670.

International Search Report and Written Opinion for PCT application No. PCT/US504/25060, dated: May 28, 2008, 4 pgs.

* cited by examiner

|  SET OF TYPES | |
|---|---|
| T ::= N | NOMINAL TYPE |
| \| T[] | ARRAY WITH ELEMENT TYPES T |
| \| either{...;L;...} | DISJOINT UNION |
| \| struct{...;L;...} | LABELED TUPLE |
| \| all{...;L;...} | INTERSECTION |
| \| definitely<T> | NON-NULL |
| \| maybe<T> | POSSIBLY NULL |
| \| sequence<T> | STREAM |
| \| delegate<T> | ANONYMOUS DELEGATE |
| L ::= T\| T m | OPTIONALLY LABELED MEMBER |

FIG. 5

| SET OF OPERATIONS ON THESE TYPES | |
|---|---|
| E ::= e.f | NORMAL FIELD ACCESS |
| \| e...f | TRANSITIVE FIELD ACCESS |
| \| e.m(...,e,...) | METHOD CALL |
| \| e.f(....,e,....) | DELEGATE INVOCATION |
| \| e.{s} | APPLY-TO-ALL |
| \| e[e] | FILTER |
| \| new (N)(...,(m:=)e,...) | CONSTRUCTION |

FIG. 6

LIFTING OF MEMBER ACCESS/FIELD PROPERTIES

LIFTING OF OPERATORS

LIFTING OF RECEIVERS

MAYBE<FORM>.CONTAINS<CONTROL C>

FORM.CONTAINS<CONTROL C>

LIFTING OF SOME OR ALL ARGUMENTS

FORM.CONTAINS(MAYBE<CONTROL>)

FORM.CONTAINS<CONTROL>

TYPE-SYSTEM EXTENSIONS FOR OBJECT-ORIENTED LANGUAGE BASED ON COERCIVE SUBTYPING WITH RESTRICTIONS

CROSS-REFERENCE TO RELATED APPLICATIONS

This application is related to co-pending U.S. patent application Ser. No. 10/903,761 entitled "COMPOSITIONAL LIFTING OF OPERATIONS OVER STRUCTURAL TYPES" filed on Jul. 30, 2004.

TECHNICAL FIELD

This invention is related to object-oriented (OO) languages, and more specifically, to data access using an OO language.

BACKGROUND OF THE INVENTION

Programming languages need to continuously evolve to help programmers cope with complicated applications. These evolutionary steps are typically quite modest; most commonly, the provisioning of better or reorganized APIs (Application Program Interfaces). Occasionally, a more radical evolutionary step is taken. One such example is the addition of generic classes to languages such as both Java and $C^\#$.

The time has come, however, for another large evolutionary step to be taken. Much software is now intended for distributed, web-based scenarios. It is typically structured using a three-tier model consisting of a middle tier containing the business logic that extracts relational data from a data services tier (a database) and processes it to produce semi-structured data (typically XML-eXtensible Markup Language) to be displayed in the user interface tier. These middle tier applications are most commonly written in an object-oriented language such as Java or $C^\#$ and have to deal with relational data (essentially SQL (Structured Query Language) tables), object graphs, and semi-structured data (e.g., XML, HTML).

Unfortunately support for such data access has barely evolved at all. All that exists is naive access via simple APIs. Consider the following fragment of Java that uses JDBC (Java DataBase Connectivity—which is an API that lets a Java application access a database via SQL) to query a SQL database (the user-supplied country is stored in variable input).

```
Connection con=DriverManager.getConnection( . . . );
Statement stmt=con. createconnection( );
String query="SELECT * FROM COFFEES WHERE Country=""+input+" "";
ResultSet rs=stmt.executeQuery(query);
while (rs.next( )) {
String s=rs.getString("Cof_Name");
float n=rs.getFloat ("Price");
System.out.println(s+"-"+n>;
}
```

Using strings to represent SQL queries is not only clumsy but also removes any possibility for static checking. The impedance mismatch between the language and the relational data is quite striking; e.g., a value is projected out of a row by passing a string denoting the column name and using the appropriate conversion function. Perhaps most seriously, the passing of queries as strings is often a security risk (the "script code injection" problem—e.g., consider the case when the variable input is the string "'OR 1=1 –".

The future of e-commerce is largely dependant on development of what are referred to as Web Services, which are Internet-based APIs that provide valuable functions or services for users. For example, Microsoft Passport® is a Web Service that facilitates user interaction by transferring user profile information to designated websites. The broad idea behind Web Services is to loosely couple heterogeneous computer infrastructures together to facilitate data transmission and computation to provide the user with a simple yet powerful experience.

A significant component in functionality of Web Services is programmatic interaction with web data. However, the world of web data is presently quite disjunctive. In general, there are three major components that make up the world of web data relational data (e.g., SQL), semi-structured data (e.g., XML), and a runtime environment. FIG. 1 illustrates a Venn diagram 100 that depicts a conventional web data world. A popular method of implementing a relational data model is by means of SQL that facilitates accessing data of a relational database system which is typically stored in tables. An accepted standard for semi-structured data is XML. XML is a World Wide Web Consortium (W3C) standard language that describes data via a schema or Document Type Definition (DTD). XML data is stored through the use of tags. A runtime environment is a general-purpose multilanguage execution engine (e.g., Common Language Runtime (CLR)) that allows authors to write programs that use both relational data and self-describing data.

However, in common with the situation with relational data access, there is also an impedance mismatch between looseness of the "document world" from which XML evolved, and a more structured world of object-oriented (OO) programming languages, which dominate the applications world. Bridging these two worlds today is conventionally accomplished by employing specialized objects that model the XML world called "XML Document Object Model," or by "XML Serialization" technologies, which intelligently map one world into the other at runtime. However, these bridging mechanisms are often cumbersome and/or limited in functionality.

Object-oriented languages like C++, Java, and C# provide a way of defining classes and/or structs, and then constructing instances of those types via "constructors" using the "new" operator. The objects being constructed and the arguments being passed to the constructors are all strongly typed. These languages usually also provide convenience mechanisms for initializing simply homogeneous arrays of objects. These constructs are designed to make programs written in these languages run fast.

XML, on the other hand, provides syntax for describing heterogeneous graph(s) of data where typing rules (usually called "schema validation") are entirely optional and loosely bound to those type instances. Furthermore, the XML schemas associated with those documents can describe more complex structures with sequences, choices, unbounded type collections, and a combination of typed and untyped data using constructs like <xsd:any/> and <xsd:anyAtrribute/>. These constructs are designed to allow a loosely coupled architecture that minimizes hard dependencies between different parties that make up a complex distributed system and have proven to be the only way to make distributed systems scale up to a level of complexity required for today's interconnected business systems.

Seamless integration of data-access in an OO host language is an extremely tricky problem and many people have attempted to solve this problem in the past with varying degrees of success. At the heart of the problem are three different and distinct type systems: the semi-structured XML that is used to describe data elements on web page and business-to-business documents; the SQL language, that is used to interrogate and process data in a relational database; and, the CLR, which are OO services and security services that applications can use.

Dealing with the complexity of these disparate models is a major pain for programmers today, since mainstream programming languages like C, C++, VB, C#, or Java simply do not know anything about relational or semi-structured data, yet programmers need to deal with all three data models at once.

Most programming languages do not provide an integrated view of these three worlds, but typically provide a "hands off" API to access one domain from the other. However, data integration via APIs has reached its limits. Alternatively, various methods of so-called data-binding have been explored where concepts from an XML or relation world are mapped onto the OO world. However, without type-system and language extensions these attempts will only be of limited value because of the size of the impedance mismatch they are attempting to bridge.

Unfortunately API support in both Java and C# for XML and XPath/XQuery is depressingly similar. XPath has been widely used in the XML community as a query language to navigate and retrieve from an XML data source. Furthermore, XQuery uses XPath as its query language to retrieve data from an XML data source.

Due to the increasingly complex nature of software systems, programmers have been riddled by undetectable programmatic errors that oftentimes do not manifest until too late. Developers continue to try to expand power of programming languages by incorporating complex mathematical and philosophical concepts. Additionally, the software market is becoming increasingly platform independent and service oriented. Combining powerful object-oriented programmatic concepts into the new data centric and service based world causes programmers problems as they try and piece together best parts of a multitude of different technologies in an ad hoc fashion.

Type systems are a formal mechanism for ensuring that typed programs perform correctly and in a well-behaved manner. Typed programs or typed systems are generally programs or systems that assign types to variables (e.g., Boolean, integer, real, etc.) or objects. Types are classifications of data that describe how a programmer wants to use the data and how a compiler should interpret such data. However, many functions are only defined to work on particular types (e.g. integer addition or floating point addition). If a given function is defined to work with a certain data type and it receives a different type of data, a type error will be produced. A type system can prevent certain execution errors by utilizing a type-checking algorithm to determine whether a program is well behaved or ill behaved. This process is referred to as type checking. Type checking allows for early detection and therefore correction of errors that may often go undetected by programmers. If such errors are left uncorrected they may lurk in the code, only to become manifestly obvious at a most inopportune time.

In general there are two varieties of type systems—nominal and structural. A nominal type system is a system in which type names are used to determine whether types are equivalent. In a structural type system, names are not essential, because types are said to be equivalent if they have the same structure, as the name suggests. For example assume Type A=string of integers (1 . . . 10) and Type B=string of integers (1 . . . 10). Further assume that a is of Type A, b is of Type B, and the expression a=b is written into the same program. Under a nominal type system this expression would produce an error because a and b are of different types. Under a structural type system such an assignment would be legal because the types are equivalent.

There is an unmet need for common OO languages to evolve to support data access associated the rich structure of both relational and semi-structured data.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a type system that provides seamless integration of data-access in an object-oriented (OO) host language. The invention provides a type-system that works with a corresponding set of syntactic constructions to extend the OO paradigm to encompass semi-structured and relational data. The syntactic extensions are compiled via a type-directed translation method that lifts member-access on base types to the newly introduced types.

In another aspect of the present invention, the core language of the type system includes nominal types, discriminated unions, tuple types, intersection types, anonymous delegate types, streams, and array types.

In yet another aspect thereof, covariance is restricted to identity conversions.

In still another aspect of the present invention, congruence relationships are defined for certain types that induce an equivalence relation on the types. This allows the same underlying type to be denoted by a different type expression.

In another aspect of the present invention, the type system includes updates by introducing a type constructor of 1-values.

In another aspect thereof, generic classes are supported through the use of stratification. By way of a kind system, the types are partitioned into different buckets to prevent problematic instantiations. The partitions can be at different granularities.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 5 illustrates a table of types that facilitate data access in accordance with the present invention.

FIG. 6 illustrates a table of operations that can be applied to the types of FIG. 5 to facilitate data access in accordance with the present invention.

DETAILED DESCRIPTION OF THE INVENTION

Figure 1:
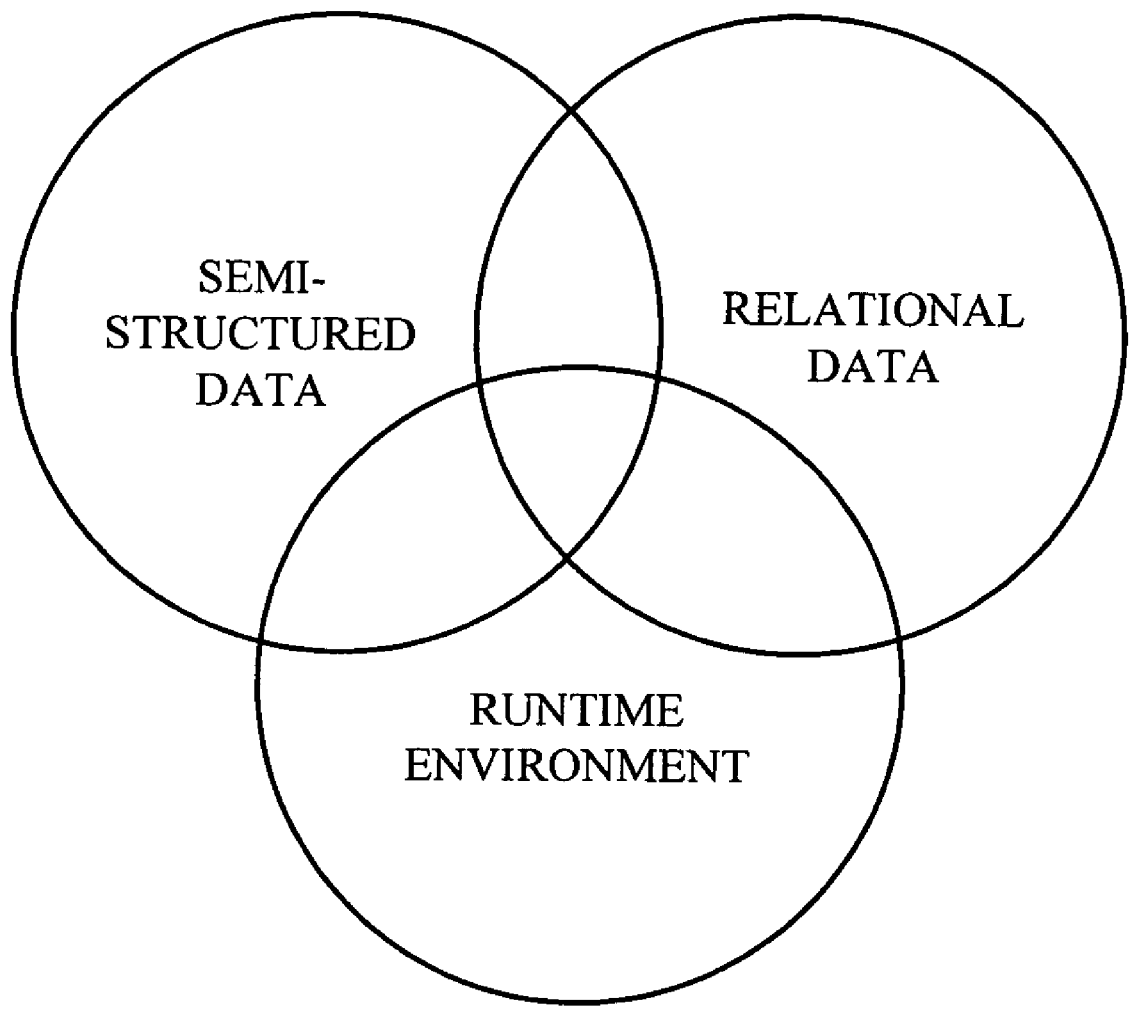
FIG. 1 illustrates a Venn diagram that depicts a conventional web data world.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 2:
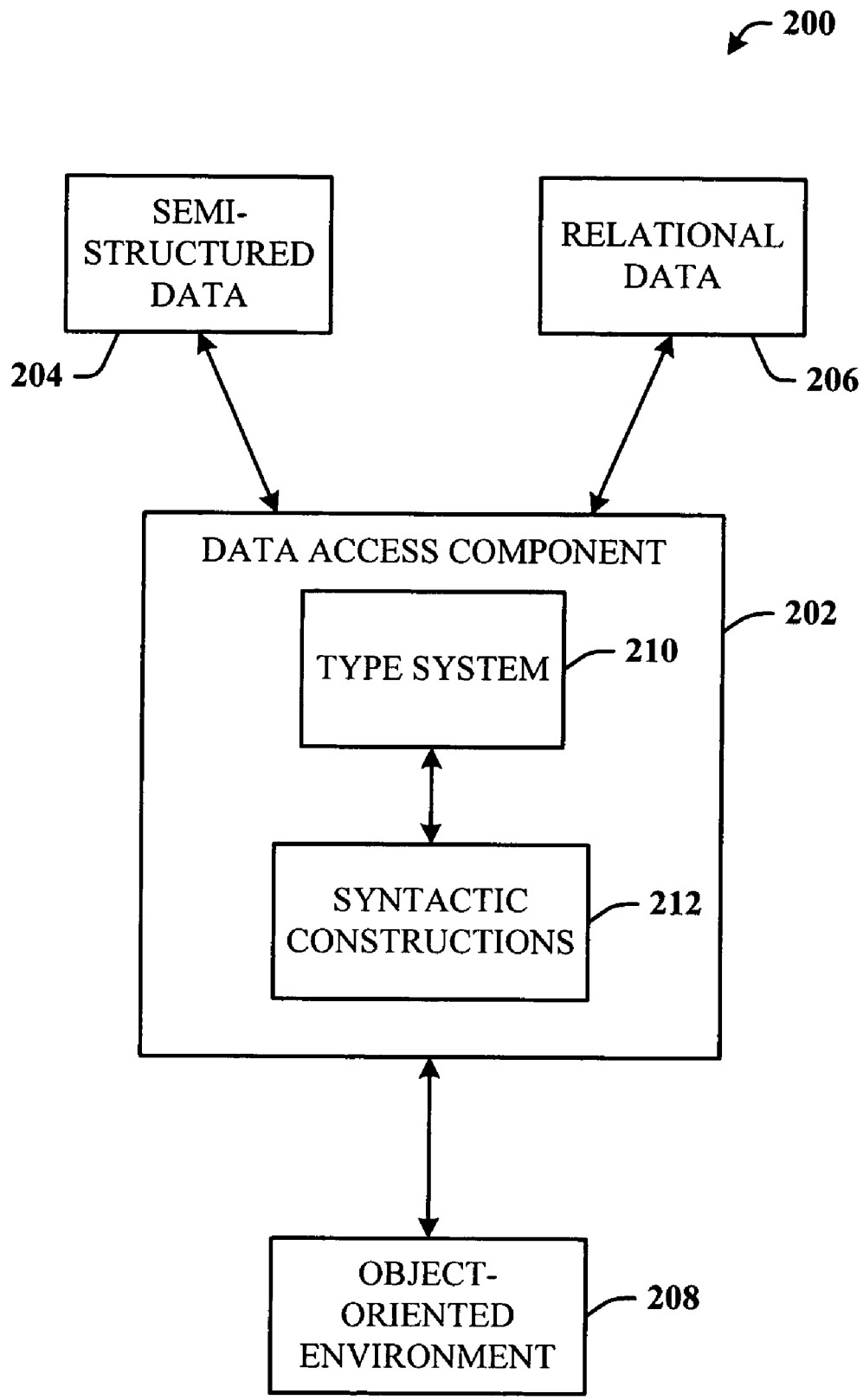
FIG. 2 illustrates a block diagram of a system that employs a data access component that facilitates seamless data access of both semi-structured and relational data in an runtime environment in accordance with the present invention.

Referring now to FIG. 2, there is illustrated a block diagram of a system 200 that employs a data access component 202 that facilitates seamless data access of both semi-structured and relational data in an runtime environment 208 (e.g., object-oriented (OO)), in accordance with the present invention. The runtime environment 208, inter alia, compiles high level programming languages into machine instructions that can subsequently be executed by a processor. As illustrated, the present invention describes a language solution to bridge technological gaps rather than utilizing APIs (Application Programming Interfaces), like conventional technologies. The language solution integrates the worlds of relational data (e.g., SQL-Structured Query Language), semi-structured data (e.g., XML-eXtensible Markup Language), and the runtime environment 208 (e.g., CLR (Common Language Runtime) or JVM (Java Virtual Machine)) to present a coherent and unified interface to all three worlds. The amalgamation of worlds is accomplished by delving deeper than APIs and building a unified extended type system. Thus, the present invention facilitates incorporating some of the best features of many present day languages into a single cohesive language.

There exists semi-structured data 204 and relational data 206 for accessing by the runtime environment 208. Such interaction is desired in the conventional web data world. A popular method of implementing a relational data model 206 is by means of SQL that facilitates accessing data of a relational database system which is typically stored in tables, and an accepted standard for the semi-structured data 204 is XML. The OO runtime environment 208 allows an author to write programs that use both relational data and self-describing data.

Bridging the conventional impedance mismatch between the runtime environment 208 and both the semi-structured data 204 and the relational data 206 is the novel data access component 202, which includes a type system 210 and associated syntactic constructions 212 to facilitate seamless interaction therebetween in accordance with the present invention.

It is to be appreciated that the disclosed type system 210 and associated constructions 212 support independent interaction of the data sources (204 and 206) with the runtime environment 208, such that it is not required that both the data sources (204 and 206) be accessible to facilitate all interactions.

Figure 3:
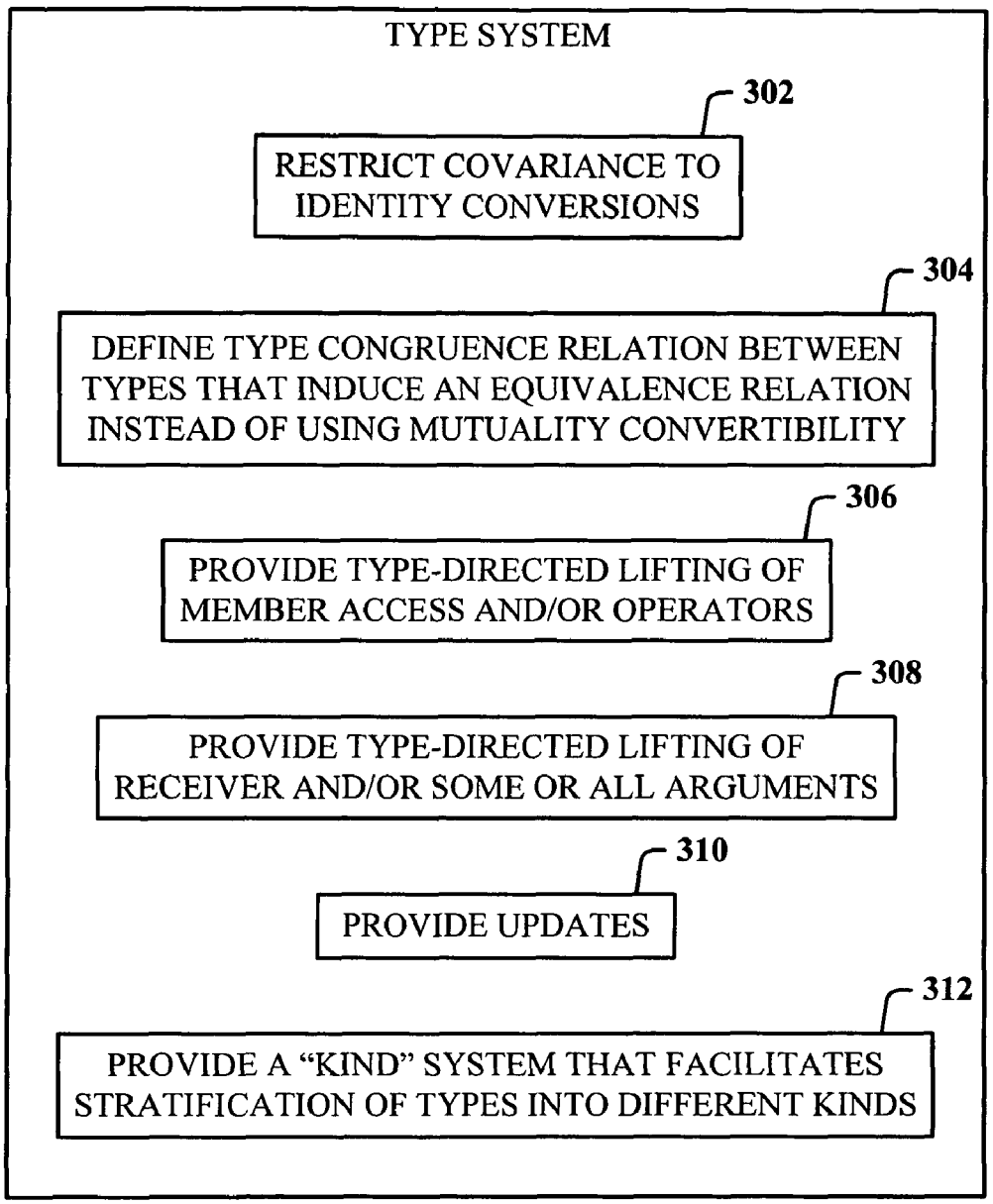
FIG. 3 illustrates a type system that provides relational and semi-structured data access in accordance with the present invention.

Referring now to FIG. 3, there is illustrated a type system 300 that provides relational and semi-structured data access in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 302, the system 300 restricts covariance to identity conversions on the underlying element type. At 304, the system 300 defines a number of type congruencies between types that induce an equivalence, instead of using mutual convertibility. This allows the same underlying type to be denoted by a different type-expression. At 306, the system 300 provides type-directed lifting of member access and/or operators. At 308, the system 300 provides type-directed lifting of a receiver and/or some or all of the arguments. At 310, the system, 300 provides updates. At 312, the system 300 provides a "kind" system that facilitates stratification of types into different kinds.

Figure 4:
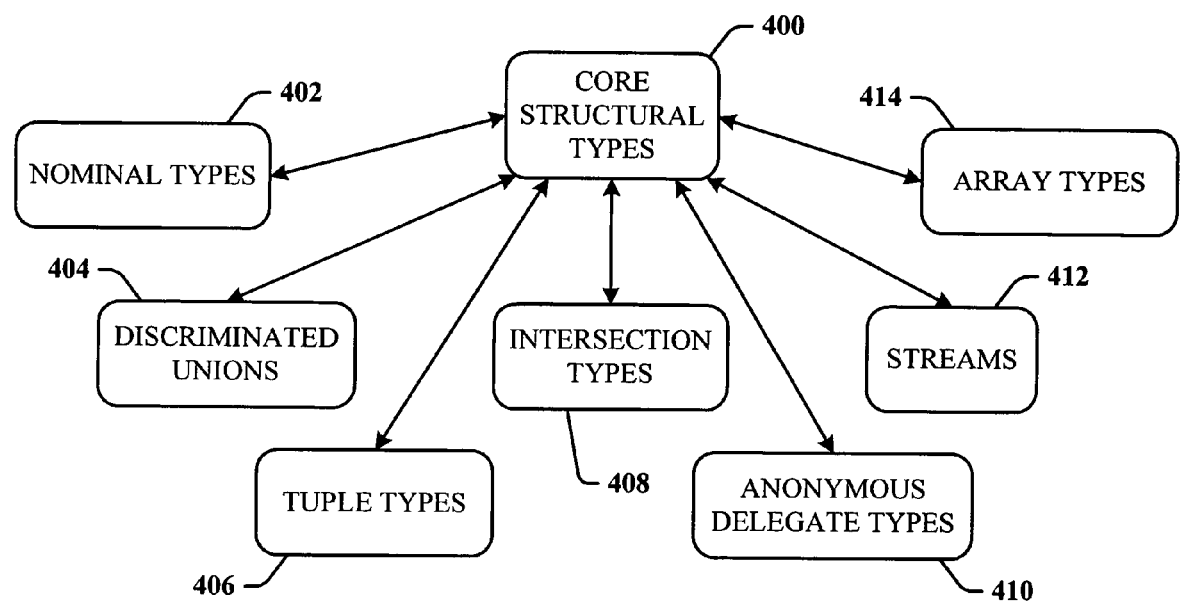
FIG. 4 illustrates core structural types of the type system of the present invention.

Referring now to FIG. 4, there is illustrated core structural types 400 of the type system of the present invention. The core types 400 include nominal types 402, discriminated unions 404, tuple types 406, intersection types 408, anonymous delegate types 410, streams 412, and array types 414.

Referring now to FIG. 5, there is illustrated a table of types 500 that facilitate data access in accordance with the present invention. The types are defined by the following abstract syntax:

| | | |
|---|---|---|
| T ::= N | | nominal type |
| \| T [ ] | | array with elements of type T |
| \| either{...;L;...} | | disjoint union |
| \| struct{...;L;...} | | labeled tuple |
| \| all {...;L;...} | | intersection |
| \| definitely<T> | | non-null |
| \| maybe<T> | | possibly null |
| \| sequence<T> | | stream |
| \| delegate T(...,T,...) | | anonymous delegate |
| L ::= T \| T m | | optionally labeled member |

Referring now to FIG. 6, there is illustrated a table of operations 600 that can be applied to the types 500 of FIG. 5 to facilitate data access in accordance with the present invention. The operations on these types are defined by the following abstract syntax:

| | |
|---|---|
| E ::= e.f | normal field access |
| \| e...f | transitive field access |
| \| e.m(...,e,...) | method call |
| \| e.f(... .,e,... .) | delegate invocation |
| \| e. {s} | apply-to-all |
| \| e[e] | filter |
| \| new (N) (..., (m:=)e,...) | construction |

Note that the concrete syntax for these types and the set of operations can be different in any actual programming language that embodies the described invention.

Nominal types N are existing types such as value types, reference types, interfaces or (nominal) delegates that are either built-in or defined using some mechanism for introducing nominal types, e.g., class, value type, interface or delegate declarations:

class Point{int x; int y;}
class Punt{int x; int y;}
delegate int F(int n)
struct Person{string Name; int Age;}

Nominal types are called nominal because the equivalence and subtype relationship between these types is determined by their (fully qualified) name. For instance, while the types Point and Punt above both contain exactly the same members and hence, are structurally the same, they are considered as different types by the type system because they have a different declared name. The subtype relationship between nominal types is also determined from their declaration/name. For example, given a derived type ColorPoint defined as, class ColorPoint: Point{Color color;}.

An implicit reference conversion is automatically obtained between ColorPoint and Point, which is written as ColorPoint <: Point→id. In general, the subtype relation is written S<: T→f, meaning that S is a subtype of T and f is a witness that coerces a value of type S to a value of type T.

Array types are also standard, but in contrast to nominal type, the equivalence of arrays is determined by their structure, a new array type is not declared each time one is used. For example, using the type Point[ ] in one program is the same as another use of the type Point[ ] as long as the two types Point are the same. Subtyping on arrays is covariant, which means that if the element types of two arrays are in a subtype relation, the two arrays created from these types are also in a subtype relation. A property of the covariance of arrays is that it is restricted to identity conversions on the underlying element type. This is written using the following rule:

$$\frac{S <: T \rightsquigarrow id}{S[] <: T[] \rightsquigarrow id}$$

The new types described herein are structural types such as discriminated unions, tuple types, intersection types, streams, and anonymous delegate types. The associated structural properties are defined next. In addition to subtype relationships between types, a number of type congruencies (≡) are introduced between types that induce an equivalence relation on types. This allows the same underlying type to be denoted by a different type-expression.

The value type tuple type struct { ... ;T $m_{opt}$; ... } is a heterogeneous ordered finite collection of optionally labeled members. For example, values of type struct{bool; int x; char c;} are triples containing an unlabeled Boolean, an integer labeled x, and a character labeled c.

Tuple types are covariant, provided the corresponding conversion on the members is an identity conversion $$\frac{... S <: T \rightsquigarrow id ...}{\text{struct}\{...; S\ m; ...\} <: \text{struct}\{...; T\ m; ...\}}$$

The members of a tuple type can be accessed by position, or when they are labeled by their label. For example, given a value s of the example tuple type, its members can be accessed using the following expressions:

struct{bool; int x; char c;} s=new(true, x=4711; c='a');
bool b=s[0];
char d=s.c;
int y=s.x;

All label-based access on tuple types can be translated into positional access via a type-directed translation. This is especially relevant when member access is lifted over tuple types. For example, given a nested tuple type, the members of the nested inner struct can still be transparently accessed from the outer one struct {
Button b;
struct{bool; int x; char c;};
} ns;
char d=ns.c; // ns[1].c, or ns[1][2]

Note that while the tuple type has no direct member labeled c, the member c of the nested struct can be transparently accessed. The compiler uses the static type of the receiver ns in the expression ns.c to determine how to access the member c.

The types definitely<T>, maybe<T>, and sequence<T> denote streams of values, and are flattened. That is, the following types are considered equivalent:

definitely<definitely<T>>≡definitely<T>
definitely<maybe<T>>≡definitively<T>
definitely<sequence<T>>≡sequence<T>
maybe<definitely<T>>≡maybe<T>
maybe<maybe<T>>≡maybe<T>
maybe<sequence<T>>≡sequence<T>
sequence<definitely <T>>≡sequence<T>
sequence<maybe<T>>≡sequence<T>
sequence<sequence<T>>≡sequence<T>

Note that this kind of equivalence of types is usually implicit in other languages such as Java or C#. For example, in C#, the following two type declarations class C: IA, IB { } and class C: IB, IA { } are considered equivalent, i.e., class C: IA, IB { }≡class C: IB, IA { }.

Flattening of streams also works when there is an intervening either type.

definitely<either{definitely<either{ ... }>; ... }>≡
definitely<either{ ... ; ... }>
definitely<either{maybe<either{ ... }>; ... }>≡
maybe<either{ ... ; ... }>
definitely<either{sequence<either{ ... }>; ... }>≡
sequence<either{ ... ; ... }>
maybe<either{definitely<either{ ... }>; ... }>≡
maybe<either{ ... ; ... }>
maybe<either{maybe<either{ ... }>; ... }>≡
maybe<either{ ... ; ... }>
maybe<either{sequence<either{ ... }>; ... }>≡
sequence<either{ ... ; ... }>
sequence<either{definitely<either{ ... }>; ... }>≡
sequence<either{ ... ; ... }>
sequence<either{maybe<either{ ... }>; ... }>≡
sequence<either{ ... ; ... }
sequence<either{sequence<either{ ... }>; ... }>≡
sequence<either{ ... ; ... }>

The stream types form the following hierarchy, where the conversions definitively<T> <: T and T <: maybe<T> are not identity conversions.

definitively<T> <: T↝unwrap_definitely
T <: maybe<T>↝wrap_mayby
maybe<T> <: sequence<T>↝id (or alternatively a non-identity conversion wrap_sequence)

Stream types are covariant, provided again that the conversion on the underlying type is the identity for sequence and definitely. It is possible to allow a non-identity conversion for maybe.

$$\frac{S <: T \rightsquigarrow id}{\text{definitely} < S > \; <: \text{definitely} < T > \; \rightsquigarrow \; id}$$

$$\frac{S <: T \rightsquigarrow id \text{ (or a } nonidentity \text{ conversion } f)}{\text{maybe} < S > \; <: \text{maybe} < T > \; \rightsquigarrow \; id \; (e \rightarrow e.\{\text{return } f(it);\})}$$

$$\frac{S <: T \rightsquigarrow id}{\text{sequence} < S > \; <: \text{sequence} < T > \; \rightsquigarrow \; id}$$

Member access is lifted over stream types. For example, given a stream of type sequence<Button> bs, the BackColor of each button can be selected in the stream using bs.BackColor. The compiler translates this into an explicit apply-to-all operation bs.{return it.BackColor;}. For definitely <T>, it is a little different. If definitely<Button> bs, then bs.BackColor has type Color, and translated into ((Button)bs).BackColor.

Binary (and unary) operators are also lifted over maybe and sequence.

$$\frac{T^\varheart (T, T)}{\text{sequence} \; < T > \varheart \; (\text{sequence} < T >, \; \text{sequence} < T >)}$$

$$\frac{T^\varheart (T, T)}{\text{maybe} < T > \varheart \; (\text{maybe} < T >, \; \text{maybe} < T >)}$$

The lifted operation applies the operation (¤) pairwise to each element in the argument streams.

The typing rules and syntax directed translation of all types except all{ } and delegate are described in detail herein.

An extension of this system is by the notion of 1-values and updates. Updates are an aspect of imperative programming. Current XML-based languages (e.g., XQuery, XDuce, and Xtatic) lack support for updates. Moreover, conventional languages (e.g., XJ) restrict 1-values to be singletons.

The disclosed invention allows updates where 1-values are arbitrary structured types. Updating is achieved by introducing a new type-constructor of 1-values of type T, written T̲, and defining a similar notion of lifting on 1-values. An assignment expression e1=e2 then applies the 1-value translation to e1, which results in a translated expression e1' of type T, and the r-value translation to e2, which results in a translated expression e2 of some type S, where S <: T↝f and then the r-value f(e2') is assigned to the 1-value e1'.

The extension of this type-system uses generics. The type system described thus far does not support the construction of user-defined generic classes such as, class Pair<A,B> {public A first; public B second;}.

More details on generics in general, is available in the C# language specification.

Consider an interaction between generics and the disclosed type systems. Define the following class Foo<A> as, class Foo<A>{public maybe<A> a;}.

A problem is that when the type of the type-parameter A is unknown, no determination can be made of the type of the result of accessing the a member of an instance fa of the generic type Foo. Depending on what A is, the result type of fa.a can be sequence<B>, for example, when a is bound to sequence<B>, or maybe<C> when A is bound to either definitely<c> or maybe<C>.

This problem is solved by stratifying the type-system into several layers to prevent problematical instantiations like the above. One way to achieve such a stratification is by introducing a "kind" system for types, i.e., by partitioning types into different buckets. This partitioning can be at different granularities. For example, all types could be divided into two buckets; types that are not subject to congruencies; and, types that are subject to congruencies. Type variables are restricted in types that are subject to congruencies to only types that are not subject to congruencies. Given the above example, it then follows that, Foo<int>→OK
Foo<Foo<int>>→OK
Foo<sequence<int>>→Wrong, since sequence<int> is subject to congruences In this way it can always be determined by looking at the structural types in isolation what congruencies apply.

In one sample implementation of stratification, a first level includes base types, int, float, class types, and a button string.

A second level can include either or struct, that have components types of base types or the same level. A third level can include maybe, sequence, and definitely. A fourth level can include constraints for generic classes.

Figure 7:
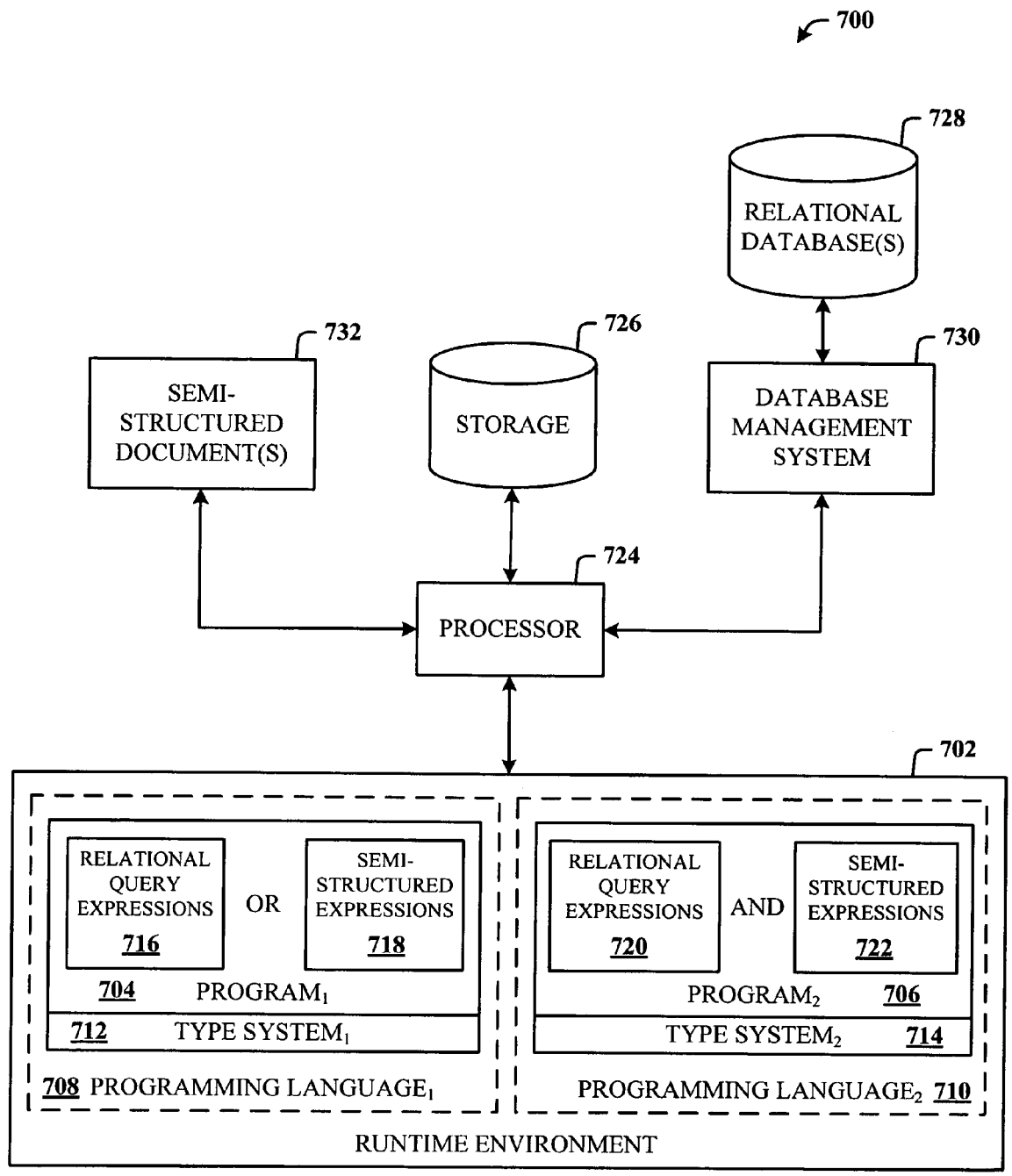
FIG. 7 illustrates a block diagram of a system that includes a runtime environment that facilitates multi-data access in accordance with the present invention.

Referring now to FIG. 7, there is illustrated a block diagram of a system 700 that includes a runtime environment 702 that facilitates multi-data access in accordance with the present invention. The runtime environment 702 is operable to run one or more programs, here, a first program 704 (denoted PROGRAM$_1$) and a second program 706 (denoted PROGRAM$_2$). Each of the first and second programs (704 and 706) can be written by a different programming language. That is, the first program 704 can be written according to a first programming language 708 (also denoted PROGRAMMING LANGUAGE$_1$) and the second program 706 can be written according to a second programming language 710 (also denoted PROGRAMMING LANGUAGE$_1$). Given that the programming languages (708 and 710) are different, each employs a different type system where necessary to access the data sources. Thus, the first programming language 708 employs a first type system 712 (also denoted TYPE SYSTEM$_1$) and the second programming language 710 employs a second type system 714 (also denoted TYPE SYSTEM$_2$).

The first program 704 can be written using the first type system 712 to process either relational query expressions 716 or semi-structured expressions 718. In contrast, the second program 706 can be written using the second type system 714 to process both relational query expressions 720 and semi-structured expressions 722. Both the first and second programs (704 and 706) can be executed in the same runtime environment 702 according to conventional program execution architectures.

It is to be appreciated that where the same programming language is used for both the first and second programs (704 and 706) a common type system can be used to facilitate data access of both the data sources. It is further to be appreciated that the disclosed type system is not restricted to only two data sources, but can be implemented with suitable types and constructions to interface with a third data source (not shown) or even a fourth data source (not shown) that is different from the first three.

The programming languages (708 and 710) are run on top of the runtime environment 702. The runtime environment 702, inter alia, provides services to the programming languages (708 and 710) such as automatic memory management, code security, and debugging facilities, which allows authors to focus on an underling logic of their applications rather than details of implementation. The first programming language 708 provides a vocabulary and set grammatical rules that authors can use to implement desired functionality of their applications. In one implementation, the first programming language 708 can be is a strongly typed object-oriented language that is tightly integrated with a compiler and the first type system 712. This allows programs to be thoroughly error checked prior to execution.

The first program 704 employs the vocabulary and grammatical rules of the first programming language 708 to develop an application. Once the first program 704 is written, it is compiled. The first program 704 can be compiled into an intermediate language (IL) or directly to machine code. A processor 724 can then execute the first program 704 via the runtime environment 702. The processor 724 can also interact with a storage 726 to facilitate execution of the first program 704.

The semi-structured expression(s) 718 can be a part of the first program 704. When employed in the first program 704, the semi-structured expressions 718 are utilized to retrieve semi-structured data 732 (e.g., XML literals or object instances from XML documents). The semi-structured expressions 718 allow navigation to and retrieval of data in an XML document, for example, similar to the approach taken by the W3C recommended XML Path Language (XPath).

Alternatively, the relational query expressions 716 can be a part of the first program 704, and are comprised of query terms, logical operators, and special characters that allow authors to specify how and which data is to be retrieved from a relational database 728. The relational database 728 can store massive amounts of data in the form of tables that can be accessed, retrieved, or otherwise manipulated programmatically. The processor 724 is operably connected to database management system (DBMS) 730, and retrieves data from relational database 728 by requesting information from the DBMS 730 via the relational query expressions 716.

In an alternative implementation to the first program 704, the second program 706 utilizes both the relational query expressions 720 and the semi-structured expressions 722, which facilitates accessing both the relational database 728 and the semi-structured documents 732 as provided by the second type system 714.

Figure 8:
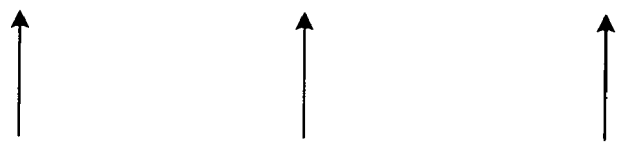
FIG. 8 illustrates an example of the lifting of member access/field properties in accordance with the present invention.

FIG. 8 illustrates an example of the lifting of member access/field properties in accordance with the present invention. It is called lifting since it lifts the operation on the underlying types to the constructed types.

Figure 9:
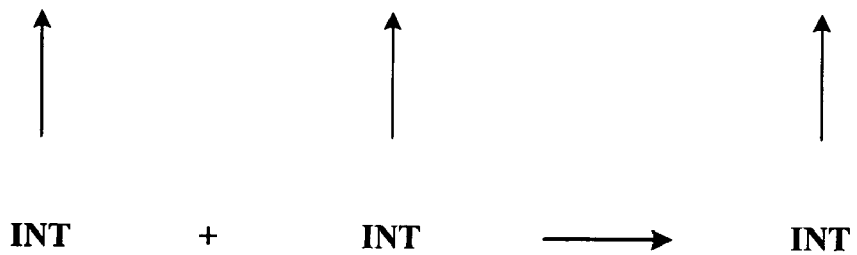
FIG. 9 illustrates an example of the lifting of operators in accordance with the present invention.

FIG. 9 illustrates an example of the lifting of operators in accordance with the present invention.

Figure 10:
FIG. 10 illustrates an example of the lifting of receivers in accordance with the present invention.

FIG. 10 illustrates an example of the lifting of receivers in accordance with the present invention.

Figure 11:
FIG. 11 illustrates an example of the lifting of some or all of the arguments in accordance with the present invention.

FIG. 11 illustrates an example of the lifting of some or all of the arguments in accordance with the present invention.

Figure 12:
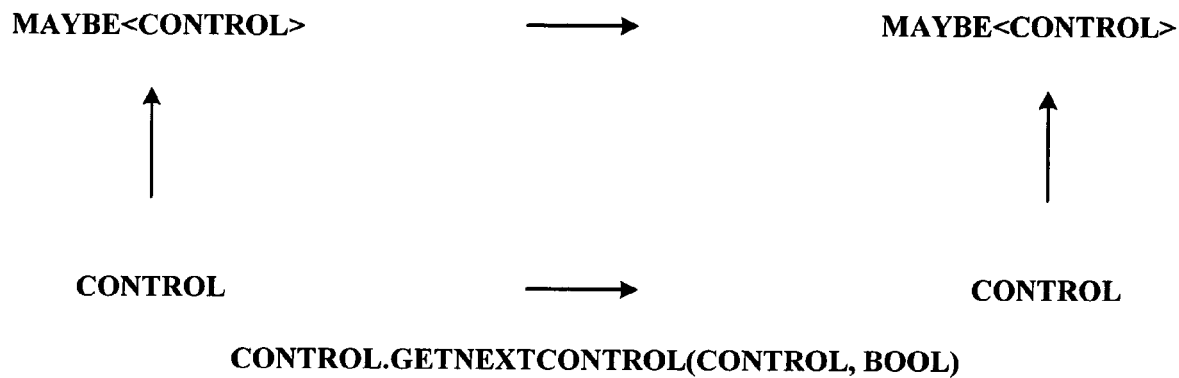
FIG. 12 illustrates an example of the lifting of receivers and some or all of the arguments in accordance with the present invention.

FIG. 12 illustrates an example of the lifting of receivers and some or all of the arguments in accordance with the present invention. The method includes two parameters Control and bool, of which only Control gets lifted. The following sample code represents what is happening in FIG. 12.

public Control GetNextControl (

Control ctl, bool, forward

);

Coercive subtyping implies that there is a subtype relationship between types. If it is desired to transfer a value from a first type to a second type, nothing additional needs to be done if the first type is a subset of the second type. However, it is to be appreciated that sometimes the values are different. Thus, some work or conversion must be performed. For example, integers are a subtype real numbers. By representation, however, integers are 23-bit and floating point numbers are 64-bit. Thus, when converting from integer to floating point, a change in representation of the value occurs (i.e., coercive subtyping). Coercive subtyping is costly because of the change in representation involved. All of the subtyping should be inexpensive because all of the subtyping is implicitly convertible. Thus, there is point at which a decision is made as to whether to convert the values based on cost. There is a way to restrict subtyping of a complicated type based on some criteria on the subtyping of the component types.

In one implementation, a heuristic is employed to determine when to make the conversion based on the costs associated therewith.

In another implementation, artificial intelligence (AI) can be employed to analyze the cost and make the decision to convert. The subject invention can employ various AI-based schemes for carrying out various aspects thereof. For example, a process for determining the cost associated with a conversion can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria when to make the conversion based on the cost of conversion, when to convert based on the type of values, and when to make the conversion based on the kind of data being processed.

Application to C# Programming Language

Following is a description of a lightweight extension of the popular object-oriented language C# in accordance with the present invention. Notable features include type-theoretic integration of the three prevalent data models in web-based applications, namely the object-oriented, relational, and semi-structured models of data. This is achieved by extending the class-based type system of C# with streams, particular forms of tuple and discriminated union types, and content types. The type system and the operational semantics are described. Although C# is the basis for this example application, the disclosed extensions apply equally well to other OO languages, including Java.

The disclosed extension to C#, hereinafter referred to as "Xen", is a coherent extension of C#. This means that there is no redesign of C#, but rather the language is worked as it currently exists. Moreover, the extensions do not conflict in any way with the underlying language; C# programs should be valid Xen programs with the same behavior.

The type system of Xen is intended to be as simple as possible (in contrast with, for example, regular expression types), and to line up closely with the underlying execution environment, in our case the CLR.

From a programming perspective, the real power of Xen comes from its elegant and coherent query-like capabilities. These have been carefully designed to mimic existing query languages, in particular XQuery and SQL, as closely as possible. This principal has had the most profound effect upon the overall design of Xen.

Extensions to the type system-streams, tuple types, discriminated unions, and content classes—and for each are considered the new query capabilities.

The first structural type added is a stream type. For example, sequence<int> is the type for homogeneous sequences of integers. Streams in Xen are aligned with iterators. Thus, streams are generated lazily using iterator blocks and consumed using the foreach statement. For example, given a stream zones of type sequence<int>, the following statement prints each element in that stream:

foreach(int zone in zones) Console.WriteLine(zone);

C# member access is generalized to map over streams, e.g., zones.ToString( ) implicitly maps the call over the elements of the stream and returns a value of type sequence<string>. Another difference between iterators in C# is that streams in Xen are automatically flattened. Consider a type CD that contains a member zones of type sequence<int>. Then, given a stream cds of type sequence<CD>, all zones are converted to strings by writing cds.zones.ToString( ). In other words, member access has been generalized so that it behaves like a path expression. Thus, a design goal of Xen was to add XPath-like query expressions to C# in a lightweight and coherent way.

The second structural types added are tuple types. A tuple type is like a tuple, and is written as struct {int i; Button;}, for example. A value of this type contains a member i of type int and an unlabeled member of type Button. A value of this type can be constructed with the following expression: new (i=42, new Button ( )). To access components of tuple types, the notion of member access is generalized. Thus, assuming a value x of the previous type, x.i is written to access the integer value. Unlabeled members are accessed by their position; for example, x [1] returns the Button member. As for streams, member access is lifted over unlabelled members of tuple types. To access the Backcolor property of the Button component in variable x it can be written x.Backcolor, which is equivalent to x[1].Backcolor.

Xen also allows repeated occurrences of the same member name within a tuple type, even at different types. For example, assume the following declaration: struct{int i; Button; float i;} z; Then z.i projects the two i members of z into a new tuple type that is equivalent to new (z[0], z[2]) and the type struct{int; float;}.

The third structural type added is a particular form of discriminated union type, called an either type. This is written, for example, either {int; bool;}. As the name suggests, a value of this type is either an integer or a Boolean. Like unions, discriminated unions in Xen inherently know their type. Again, member access has been generalized over discriminated unions. As either types have a disjunctive flavor, stream types are used to handle the possibility that the element is not of the required type. Consider a discriminated union value w of type either{int; Button;}. An attempt can be made to access the color of w using the lifted member access expression w.Backcolor. This will return a value of type sequence<Color>, which is either a singleton stream containing the color value when w contains a Button, or the null pointer (the empty stream) when w happens to be an integer. Again, the path expression behavior is representative of XPath.

Content classes are the fourth type-system extension added to C#. A content class is a normal class that has a single unlabelled type that describes the content of that class. From an XSD (XML Schema Definition) perspective, classes correspond to global element declarations, while the content type of classes correspond to complex types.

These type extensions form the essence of Xen. While being quite simple they are in fact sufficiently powerful to represent both relational and semi-structured data. Relational tables are merely streams of tuple types. For example, the relational table created with the SQL declaration:
CREATE TABLE Customer (name string, custid int);
can be represented as the Xen declaration:
sequence<struct{string name; int custid}> Customer;
Similarly, the following XSD schema,
<element name="Address"><complexType><sequence>
<choice>
   <element name="Street" type="string"/>
   <element name="POBox" type="int90/>
</choice>
<element name="City" type="string"/>
</sequence></complexType></element>
can be represented as the Xen content class declaration:
class Address {
struct{either{string Street; int POBox;}; string City;}
}

Core Language of Xen-InnerXen

An InnerXen program consists of one or more class declarations. Each class declaration defines zero or more methods and contains exactly one unlabeled type that is called the content type (collections of field declarations can be encoded). A class declaration with a content type is called a content class. InnerXen follows C# and requires methods to be explicitly marked as virtual or override. Given a program, it is assumed that there is a unique designated method within the class declarations that serves as the entry point.

| | | |
|---|---|---|
| Program | p ::= $\overline{cd}$ | |
| Class Definition | cd ::= class c : c{ τ; $\overline{md}$ } | |
| Method Definition | md ::= virtual τm( $\overline{τx}$ ){ $\overline{s}$ } | |
| | \| override τm( $\overline{τx}$ ){ $\overline{s}$ } | |

InnerXen supports two main kinds of types: value types and reference types. As usual, the distinguished type void is used for methods that do not return anything. Value types include the base types bool and int and the structural types: tuple types and discriminated unions. Reference types are either class types or streams. As usual, only reference types have object identity and are represented at runtime by references into the heap. A designated special class object is assumed.

| | | |
|---|---|---|
| Types | τ ::= γ | Value types |
| | \| ρ | Reference types |
| | \| void \| null | Void and null types |
| Value Types | γ ::= b | Base types |
| | \| struct{ $\overline{fd}$ } | Tuple types |
| | \| either{ $\overline{fd}$ } | Disjoint union types |
| Base Types | b ::= bool \| int | |
| Reference Types | ρ ::= c | Classes |
| | \| sequence<τ> | Stream types |
| Field Definition | fd ::= τ,f; | Named member |
| | \| τ, | Unnamed member |

InnerXen expressions, as for C#, are split into ordinary expressions and promotable expressions. Promotable expressions are expressions that can be used as statements. A number of built-in primitive operators are assumed, such as ==, | | and &&. In the grammar, it is written e⊕e, where ⊕ denotes an instance of one of these operators.

Explanation of these expressions that are new for InnerXen is deferred hereinbelow to where the InnerXen type system is considered.

| | | |
|---|---|---|
| Expression | e ::= b \| i | Literals |
| | \| e ⊕ e | Built-in operation |
| | \| x | Variable |
| | \| null | Null |
| | \| (τ) e | Cast |
| | \| e is τ | Dynamic typecheck |
| | \| e was τ | Static typecheck |
| | \| new τ(e) | Object creation |
| | \| new τ( $\overline{s}$ ) | Closure creation |
| | \| new ( $\overline{be}$ ) | Tuple type creation |
| | \| new τ(τ', e) | Discriminated union and internal stream element creation |
| | \| e.f | Field access by name |
| | \| e[i] | Field access by position |
| | \| pe | Promotable expression |
| Promotable expression | pe ::= x = e | Variable assignment |
| | \| e.m( $\overline{e}$ ) | Method invocation |
| | \| e. { $\overline{s}$ } | Apply-to-all |
| | \| ({ $\overline{s}$ }) | Block expression |
| Binding expression | be ::= f = e | Named binding |
| | \| e | Unnamed binding |

Statements in InnerXen are standard. The yield statement is an updated version used to generate streams.

| | | |
|---|---|---|
| Statement | s ::= ; | Skip |
| | \| pe; | Promoted expression |
| | \| if (e) s else s | Conditional |
| | \| τx = e; | Variable declaration |
| | \| return e; | Return statement |
| | \| return ; | |
| | \| yield return e; | Yield statement |
| | \| yield break ; | End of stream statement |
| | \| foreach (τ x in e) s | Foreach loop |
| | \| while (e) s | While loop |
| | \| { $\overline{s}$ } | Block |

In what follows, it is assumed that InnerXen programs are well-formed, e.g., no cyclic class hierarchies, correct method body construction, etc.

Static Semantics

In this section, the InnerXen type system is formalized and some of the new language features are described. The type system and language extensions are designed to be unobtrusive to the programmer, and things (i.e., member access over structural types) should work as expected. Additionally, the extension to subtyping is as close as possible to the spirit of host language. A goal of Xen is to keep the type system extensions few and as simple as possible.

Subtyping

Normally, subtyping is formalized by defining a relation between a subtype and a supertype. However, for the formalization of InnerXen, subtyping is treated as a coercion. Hence, the subtype relation is written τ<: τ'↝f meaning that τ is a subtype of τ' and f is a witness that coerces a value of type τ to a value of type τ'. To be more precise, f is a context, i.e., code with a designated 'hole', usually written C[ ] such that when a code fragment v of type τ is placed in the hole, the resulting code, written C[v], is of type τ'. For succinctness, rather than writing contexts, a functional notation is used, e.g., x↦ e. When no coercion is necessary (e.g., when converting from a subclass to a superclass), the identity function id, is written.

In fact, the typing judgments translate InnerXen constructs to a strictly smaller subset of the language, which is then evaluated by the operational semantics. However, to increase readability and avoid clutter, the syntactic sugar of (promotable) block expressions and apply-to-all expressions are sometimes used in the target of the translations. The rules that use such sugar are marked with an asterisk (*).

Subtyping in InnerXen is reflexive and transitive, so the following rules are immediate.

$$\overline{\tau <: \tau' \rightsquigarrow id}$$

$$\frac{\tau <: \tau' \rightsquigarrow f \quad \tau' <: \tau'' \rightsquigarrow g}{\tau <: \tau'' \rightsquigarrow e \mapsto g(f(e))}$$

Much of the previous work on using coercions to represent subtyping focuses on the problem of coherence, i.e., if there is more than one coercion between two types then they are observationally equivalent. Building upon C# and Java-coherence is too strong a condition. First, because some coercions are side-effecting, e.g., boxing, and so coherence can never hold. The second concerns how overloading is resolved (and interestingly is independent of the first). Consider the following overloaded method f.

void f (object x){Console.WriteLine("Ha");}
void f (Control x){Console.WriteLine("Ha, Ha");}

In both C# and Java, the call f (new Button ( )) prints Ha, Ha, even though both Button <: Control↝id and Button <: Control <: object↝id. This is because C# and Java determine that the first conversion is better. Since a design goal was to build directly upon C#, it is also assumed that given any two conversions τ<: τ↝f and τ<: τ'↝g (where r may be equal to r) the better conversion of the two can be determined. Whenever subsumption is used (for assignments and method calls) the best conversion is chosen. For example, the assignment x=new Button ( ) injects into control when x has type either{Control; object;}.

Value Types. Following C# a value of any value type can be coerced to the supertype object. Doing so will box the value, place it on the heap, and return the heap reference. Thus, the coercion witness is not a pure function (boxing the same value twice will not return the same reference). The following rule covers the base types and tuple types. The case for discriminated unions is described later.

$$\overline{\gamma <: object \rightsquigarrow e \mapsto new\gamma(e)}$$

Reference types. Two rules are provided. Firstly, a nominal class type c is a subtype of another class type c' if c extends c'. Secondly, null is a subtype of any reference type.

$$\frac{class \; c : c'}{c <: c' \rightsquigarrow id}$$

$$\overline{null <: \rho \rightsquigarrow id}$$

Streams. Streams represent ordered homogeneous collections of zero or more values. In Xen, streams are most commonly generated by yield blocks. The following method From generates the infinite stream of integers n, n+1, . . . :

virtual sequence<int> From(int n){for (;;) yield return n++;}

Given a stream, iteration over its elements can be performed using a foreach statement. However, Xen offers a convenient shorthand called an apply-to-all expression written as e. {s̄} which applies the method-body {s̄} to each element it in the stream e. The variable it plays a similar role as the implicit receiver argument this in methods and is bound to each successive element of the iterated stream. For instance, the apply-to-all expression below will convert the stream of natural numbers from 0 into the stream of even numbers, converts each of these into a string, and then prints them all:

From(0).{return it*it;}.ToString( ).{Console.WriteLine (it);};

Block expressions are a lightweight way to define finite streams without the need to define a generator method. For instance, the following block expression generates a stream of two strings:

sequence<string> greeting=({
yield return "Hello"; yield return "World!";
});

Generator block expressions are translated into closures. Streams are covariant provided that the conversion on the element type is the identity. The rationale for this is that implicit conversions should limited to constant-time operations. Coercing a stream of type sequence<int> to a stream of type sequence<object>, for example, would be linear in the length of the stream, as the boxing conversion from int to object is not the identity. Coercing a stream to the object type simply requires the identity witness.

$$\frac{\tau <: \tau' \rightsquigarrow id}{sequence < \tau > \; <: sequence < \tau' > \; \rightsquigarrow id}$$

$$\overline{sequence < \tau > \; <: object \rightsquigarrow id}$$

A feature of Xen is that streams are always flattened. Thus, Xen types are subject to the following equivalence.

sequence<sequence<τ>>≅sequence<τ>

Consequently, there are no streams of streams, and embedded empty streams disappear. Since null is equated to the empty stream, it follows also that element of streams are never null.

Flattening of stream types is essential to efficiently deal with recursively defined streams. Consider the following recursive variation of the function From that was defined previously:

virtual sequence<int> From(int n){
yield return n++; yield return From(n);
}

The recursive call yield return From(n); yields a stream forcing the type of From to be a nested stream. The non-recursive call yield return n++; yields a single integer thus forcing the return type of From to be a normal stream. As the type system treats the types sequence<int> and sequence<sequence<int>> as equivalent, this is type-correct.

Without flattening, it would be required to copy the stream produced by the recursive invocation, leading to a quadratic instead of a linear number of yields:

virtual sequence<int> From(int n){
yield return n++; foreach(int it in From(n)) yield return it;
}

Note that flattening of stream types does not imply that the underlying stream is flattened via some coercion; every element in a stream is yield-ed at most once. Iterating over a stream will effectively perform a depth-first traversal over the n-ary tree produced by the stream generators.

Tuple types. Tuple types encapsulate heterogeneous ordered collections of values. Members of tuple types can be labeled or unlabeled, and labels can be duplicated, even at different types. Members of tuple types can be accessed by label or by position.

Tuple types, as for streams, are covariant provided that the upcast-conversion that would be applied is the identity:

$$\frac{\overline{fd} <: \overline{fd'} \rightsquigarrow id}{\text{struct}\{\overline{fd}\} <: \text{struct}\{\overline{fd'}\} \rightsquigarrow id}$$

Subtyping respects field names: let fd, fd' be τf, and τ'f'; then $$(fd <: fd') \stackrel{def}{=} (f = f' \wedge \tau <: \tau').$$

If only one of fd or fd' has a field name, the fields are incomparable. If fd and fd' have no field name then field subtyping trivially reduces to subtyping.

Either types. A value of an either type is a discriminated union that may hold (at different times) any of the values of its members. Unlike unions in C/C++ and variant records in Pascal where users have to keep track of which type is present, values of an discriminated unions in Xen are implicitly tagged with the static type of the chosen alternative. In other words, discriminated union values are essentially a pair of a value and its static type. The special member e.value retrieves the value component of a discriminated union value e. The type component can be tested with the conformity test e was τ. The expression e was T is true for exactly one τ in τ̄. This invariant is maintained by the type system.

Like tuple types, the members of discriminated unions can be labeled or unlabeled. The following absorption rule states that a labeled member in a discriminated union is just a nested singleton tuple type:

either {τ f; $\overline{fd'}$} ≅ either{struct {τf;}; $\overline{fd'}$}

Discriminated unions are idempotent, commutative, and associative; duplicated members are ignored, the order of the members is arbitrary, and nesting is irrelevant:

either{τ; τ; $\overline{\tau'}$} ≅ either{τ; $\overline{\tau'}$}
either{τ; τ';} ≅ either{τ'; τ;}
either{either{τ̄}; $\overline{\tau'}$} ≅ either{τ̄ $\overline{\tau'}$}

Associativity also works across streams.
sequence<either{sequence<either{τ̄}>; $\overline{\tau'}$}> ≅ sequence<either{τ̄ $\overline{\tau'}$}>

Values of non-discriminated union types can be injected into a discriminated union:

$$\frac{\tau \neq \text{either } \{\overline{\tau''}\}}{\tau <: \text{either } \{\tau; \overline{\tau'}\} \rightsquigarrow e \mapsto \text{ new either } \{\tau; \overline{\tau'}\}(\tau, e)}$$

InnerXen allows width subtyping for discriminated unions. In this case the coercion is slightly more involved as it extracts the value from the source discriminated union before creating the target discriminated union.

$$\frac{}{\text{either } \{\overline{\tau_i}\} <: \text{ either } \{\text{either}\{\overline{\tau_i}; \overline{\tau'}\}\}} (*)$$
$$\rightsquigarrow e \mapsto (\{\text{if}(e \text{ was } \tau_i) \text{return new either } \{\overline{\tau_i \tau'}\}(\tau_i, e.\text{value});\})$$

Here, and in the following, the convention of indexing sequences is used, i.e., $\overline{\tau}_i$ represents a sequence of types, where each type is indexed with its position. An element of this sequence at position i is referred to as $\tau_i$.

The rules above are carefully crafted to allow alternative implementations that do not use types as tags for discriminated unions. They allow any implementation that maintains the stated invariant for the conformity test, e.g., integers tags used in the actual Xen implementation.

InnerXen follows the design of C# in allowing all values to be boxed, and hence, all value types are a subtype of the supertype object. For values of discriminated unions, boxing is a little more subtle as it should first strip off the type tag and then upcast to object.

$$\frac{\tau_i <: \text{ object } \rightsquigarrow g_i}{\text{either } \{\overline{\tau_i}\} <:} (*)$$
$$\text{object } \rightsquigarrow e \mapsto (\{\text{if}(e \text{ was } \tau_i)\text{return } g_i(e.\text{value});\})$$

Generalized Member Access

The essence of Xen is that member access is uniformly lifted over all structural types. This gives the language much of the expressive power of query languages such as XPath. This generalized member access is treated in a similar way as subtyping in that it is replaced with explicit coercions.

Each type constructor is now considered in turn and for each, two new judgment forms are formalized:

The field access judgment τ.f<: τ'↝g returns a witness g: τ→τ' that performs the lookup of field f on an instance of τ. Positional field access is analogous and omitted.

The method call judgment τ.m($\overline{\tau'}$)<: T"↝g returns a witness g: (τ,$\overline{\tau'}$)→τ" that calls the method with signature τ" m($\overline{\tau'}$) on a receiver of type τ.

Member access over streams. Lifting member access on streams is really just syntactic sugar for a simple apply-to-all expression of member access on the elements of the stream.

$$\frac{\tau.f <: \tau' \rightsquigarrow g}{\text{sequence } <\tau>.f <:} (*)$$
$$\text{sequence} <\tau'> \rightsquigarrow e \mapsto e.\{\text{return } g(\text{it});\}$$

Methods that return non-void results are lifted similarly to field-access. For example, each string can be converted to uppercase in the stream ss from earlier by simply writing ss.ToUpper( ). This expression is translated into the apply-to-all block ss.{return it.ToUpper( );}. Again, the witness for lifting general method invocation over streams introduces an apply-to-all block:

$$\frac{(\tau.m(\overline{\tau'}) <: \tau'' \rightsquigarrow g)}{\text{sequence } <\tau>.m(\overline{\tau'}) <:} (*)$$
$$\text{sequence} <\tau''> \rightsquigarrow (e, \overline{a}) \mapsto e.\{\text{return } g(\text{it}, \overline{a});\}$$

Methods that return void are applied to each element of the stream. There is no stream of void.

$$\frac{\tau.m(\overline{\tau'}) <: \text{void} \rightsquigarrow g}{\text{sequence } <\tau>.m(\overline{\tau'}) <:} (*)$$
$$\text{void} \rightsquigarrow (e, \overline{a}) \mapsto \text{ foreach } \tau \text{ it in } g \text{ (it, } \overline{a});$$

Note that even members of object are lifted. Thus, for instance, the result of calling ss.GetType( ) on a stream ss has type sequence<Type>. In order to perform method invocation on the actual stream, it casts to object first, e.g., ((object)ss).GetType( ).

Member access over tuple types. Accessing tuple type members returns a new tuple type that contains as tuple members only those that were selected from the original tuple type. For example the selection s.x on a variable s of type struct {int x; string; bool x;} returns a new tuple type of type struct (int; bool;} that is created by the expression new (s[0],s[2]). This idea of projection is given by the following rule, where the premise uses a list comprehension to generate a list of triples $(\tau_0, g_0, i)$ for each member $fd_i$ that has a member f. In the conclusion, one writes $\overline{g_i(e[i])}$ to select only those elements from the given tuple type and apply the respective conversion on that member.

$$\frac{[(\tau, g_i, i) \mid fd_i.f <: \tau \rightsquigarrow g_i]}{\text{struct } \{\overline{fd_i}\}.f <: \text{struct } \{\overline{\tau}\} \rightsquigarrow e \mapsto \text{new } (\overline{g_i(e[i])})}$$

The base case of member access is when the label of a field matches the label that is accessed.

$$\overline{\tau f.f <: \tau \rightsquigarrow \text{id}}$$

Method calls are lifted over tuple types in a similar way as member selection.

$$\frac{[(\tau', g_i, i) \mid fd_i.m(\overline{\tau}) <: \tau' \rightsquigarrow g_i]}{\text{struct } \{\overline{fd_i}\}.m(\overline{\tau}) <: \text{struct } \{\overline{\tau'}\} \rightsquigarrow e \mapsto}$$
$$\text{new } (\overline{g_i(e[i])})$$

When member selection, or method calls succeeds for just one member, the struct is not created, but just the value of that member is returned. For example, given value p of type struct{int x; int y;}, selecting p.x returns a single value x[0] of type int. This refinement should be obvious and is omitted.

Member access over discriminated unions. It is known that a given value matches exactly one of the alternatives of a discriminated union. To lift member access over discriminated unions, a conformity test of the current value is performed, and the corresponding member selected. For example, given a value x of type either (string; Person; int) where both string and Person have a member Length of type int and Inch, respectively, lifting x.Length returns a value of type Sequence<either{int; Inch;}> via the translation:

({if(x was string){yield return x.value.Length;}
if(x was Person){yield return x.value.Length;}})

The general rule for lifting field selection and method invocation over discriminated unions collects the alternatives for which the member lookup succeeds, and creates the conformity test to determine the member/method to actually select/invoke.

$$\frac{[(\tau', g_i, i) \mid \tau_i.f <: \tau' \rightsquigarrow g_i]}{\text{either } \{\overline{\tau_i}\}.f <: \text{sequence} < \text{either}\{\overline{\tau'}\} > \rightsquigarrow e \mapsto} (*)$$
$$(\{\text{if } (e \text{ was } \tau_i) \text{ yield return } g_i(e.\text{value});\})$$

$$\frac{[(\tau'', g_i, i) \mid \tau_i.m(\overline{\tau'}) <: \tau'' \rightsquigarrow g_i]}{\text{either } \{\overline{\tau_i}\}.m(\overline{\tau'}) <: \text{sequence} < \text{either}\{\overline{\tau''}\} > \rightsquigarrow e \mapsto} (*)$$
$$(\{\text{if } (e \text{ was } \tau_i) \text{ yield return } g_i(e.\text{value});\})$$

When member access succeeds for every alternative in the discriminated union, the return type can sometimes be improved. For example x.GetType( ) would return a value of type object instead of sequence<object>.

Member access over classes. Method invocation on classes, i.e., nominal types, searches the class hierarchy until a matching method is found. If a matching method $\tau'm(\overline{\tau''})$ in class c is found, the actual types of the arguments are adjusted to the types expected by m:

$$\frac{\text{class } c : c'\{\tau, \overline{md}\} \quad \tau'm(\overline{\tau''}) \in \overline{md} \quad \overline{\tau} <: \overline{\tau''} \rightsquigarrow \overline{f}}{c.m(\overline{\tau}) <: \tau' \rightsquigarrow (e.\overline{a}) \mapsto e.m(\overline{f(a)})}$$

When the method is not found in the current class, its superclass is searched. In this case, before performing the call, the receiver is upcasted. When calling a method defined on object on a base type, such as 5.GetType( ), this method invocation is translated into $$\frac{\text{class } c : c'\{\tau, \overline{md}\} \quad \tau'm(\overline{\tau''}) \notin \overline{md} \quad c'.m(\overline{\tau}) <:}{\tau' \rightsquigarrow g \quad c <: c' \rightsquigarrow f}{c.m(\overline{\tau}) <: \tau' \rightsquigarrow (e, \overline{a}) \mapsto g(f(e), \overline{a})}$$

Recall that InnerXen class declarations contain, in addition to the methods, just a single content type. Thus, one might expect that the rules for generalized member access can be blindly applied to access elements of classes. Recursion requires a different approach. Consider the following recursive class List of lists of integers:

class List {struct{int head; List;}}

Given an instance xs of type List, it is not desired that xs.head recursively select all head fields in xs. However, simply unfolding the content type and using the rules given above for generalized access over tuple types that is precisely what would happen. There are a number of solutions, but in order to keep the Xen type system as simple as possible, the recursive cycles are broken at nominal types. This means that member lookup is not performed on nominal members of the content of nominal types. Using these refined rules, the result type of xs.head is int.

Formalizing this is trivial, but time-consuming. Another family of generalized member access judgments are defined, written $\tau \cdot f \rightsquigarrow g$, which is identical to the previous rules except they are not defined for nominal types.

To define field access on nominal types, the content type of a class is first defined as follows.

$$\frac{\text{class } c\{\tau; \overline{md}\}}{\text{content } (c) = \tau} \quad \frac{\text{class } c : c'\{\tau; \overline{md};\} \quad \text{content}(c') = \tau'}{\text{content}(c) = \text{struct}\{\tau'; \tau\}}$$

InnerXen provides a special member on class values, e.content that returns the content type value. The rule for generalized field selection on classes searches for the member f on the content type of class c and then applies the witness to the content value of the instance.

$$\frac{\text{content}(c) = \tau \quad \tau \cdot f \rightsquigarrow g}{c.f <: \tau \rightsquigarrow e \mapsto g(e.\text{content})}$$

Typing InnerXen Programs

Building on the previous description subsections, the rules for forming typing judgments over InnerXen expressions, statements, method declarations and programs are now provided.

Typing expressions. For the most part, the typing judgments for InnerXen are straightforward. As subtyping is treated using coercions, a typing judgment for expressions is of the form $E \vdash e <: \tau \leadsto e'$, which means that in a typing context E (which is a map from variable names to types) expression e has type $\tau$ and is expanded to the expression e'.

The rules for expressions all follow the same pattern where the judgment on the level of expressions is defined in terms of a similar judgment on types. In addition to the member access and method call judgments described hereinabove, judgments for dynamic casting will be defined and used.

The typing judgments for literals, variables and null are standard and as follows.

$$\overline{E \vdash i <: int \leadsto i} \qquad \overline{E \vdash b <: bool \leadsto b}$$

$$\overline{E[x \leadsto \tau] \vdash x <: \tau \leadsto x} \qquad \overline{E \vdash null <: \leadsto null}$$

The judgments for casting involve the application of the upcasting judgment $\tau <: \tau' \leadsto f$ that was defined earlier and two new downcasting judgments $(\tau)\tau' \leadsto f$ and $\tau$ is $\tau' \leadsto f$.

The downcasting rule $(\tau)\tau'$ recursively deconstructs the downcast from a value of static type $\tau'$ to a value of dynamic type $\tau$ up to the point where $\tau'$ is a reference type. In that case, a true dynamic downcast can be performed based on the fact that reference types carry their dynamic type. Downcasting from a reference type to a value type also unboxes the value at runtime.

$$\overline{(\gamma)\rho \leadsto e \mapsto ((\gamma)e).content} \qquad \overline{(\rho)\rho' \leadsto e \mapsto (\rho)e}$$

Downcasting from one struct to another attempts the downcast on all the components of the struct. Here, downcasting is lifted over field declarations in the obvious way.

$$\frac{\overline{(fd_i)fd_i' \leadsto g_i}}{(struct\{\overline{fd_i}\})struct\{\overline{fd_i'}\} \leadsto e \mapsto new(\overline{g_i(e[i])})}$$

Downcasting from a discriminated union first removes the type tag and then attempts to downcast the resulting value. It is not permitted to downcast to an either type.

$$\frac{\overline{(\tau)\tau_i' \leadsto g_i}}{(\tau) \text{ either } \{\overline{\tau_i'}\} \leadsto e \mapsto (\{if\ (e\ was\ \tau_i')\ return\ g_i(e.value);\})} (*)$$

The typing judgments are now defined for both directions of casting of expressions in terms of these judgments on types:

$$\frac{E \vdash e <: \tau' \leadsto e' \quad \tau' <: \tau \leadsto f}{E \vdash (\tau)e <: \tau \leadsto f(e')} \text{(upcast)}$$

$$\frac{E \vdash e <: \tau' \leadsto e' \quad \tau <: \tau' \quad (\tau)\tau' \leadsto f}{E \vdash (\tau)e <: \tau \leadsto f(e')} \text{(downcast)}$$

Note that in order to satisfy a type soundness property, a "stupid" cast rule is defined in the now familiar fashion, but avoided here for brevity.

InnerXen has the is operator from C# that performs a dynamic check if the runtime type of an object is compatible with a given type. For this, an auxiliary judgment form $\tau$ is $\tau' \leadsto g$ is introduced that returns the witness g for testing whether a value of type $\tau$ is at runtime a value of type $\tau'$. The first three judgments are standard.

$$\frac{\gamma <: \tau}{\gamma \text{ is } \tau \leadsto e \mapsto true} \qquad \frac{\rho <: \tau}{\rho \text{ is } \tau \leadsto e \mapsto e\ != null}$$

$$\frac{\tau <: \rho}{\rho \text{ is } \tau \leadsto e \mapsto (e\ != null)\ \&\&\ (e \text{ is } \tau)}$$

The judgments for tuple types and discriminated unions show a duality. For tuple types it is recursively checked whether the is relation holds for all the components of the struct, while for discriminated unions, it is checked if any of the components was of the required type. Here, the is relation is lifted over field declarations in the obvious way.

$$\frac{\overline{fd_i \text{ is } fd_i' \leadsto g_i}}{struct\ \{\overline{fd_i}\} \text{ is } struct\ \{\overline{fd_i'}\} \leadsto e \mapsto \&\&\ \overline{g_i(e[i])}}$$

$$\overline{\text{either } \{\overline{\tau}\} \text{ is either } \{\overline{\tau\tau'}\} \leadsto e \mapsto \|\ \overline{e\ was\ \tau_i'}}$$

The typing judgment for an is expression can now be defined in terms of the judgment on types:

$$\frac{E \vdash e <: \tau' \leadsto e' \quad \tau' \text{ is } \tau \leadsto g}{E \vdash e \text{ is } \tau <: bool \leadsto g(e')}$$

The typing judgment for the expression e was $\tau$ ensures that static type of e is a discriminated union that includes $\tau$, and generates the actual runtime conformity test to check if the dynamic value of e has type tag $\tau$.

$$\frac{E \vdash e <: \text{either } \{\tau; \overline{\tau'}\} \leadsto e'}{E \vdash e \text{ was } \tau <: bool \leadsto e' \text{ was } \tau}$$

The type of an instance of a tuple type is derived from the type of the actual arguments of its constructor. The type of a binding expression f=e is derived from the binding expression e.

$$\frac{E \vdash \overline{be} <: \overline{fd} \leadsto \overline{be'}}{E \vdash new\ (\overline{be}) <: struct\ \{\overline{fd}\} \leadsto new\ (\overline{be'})}$$

The core subset of Xen supports one-argument constructors for classes that take an instance of the content type of that class:

$$\frac{E \vdash e <: \tau \leadsto e' \quad \tau <: content(c) \leadsto f}{E \vdash new\ c(e) <: c \leadsto new\ c(f(e'))}$$

Users never need to use the constructor for discriminated unions themselves, instead they can use subtyping to implicitly coerce a value into a discriminated union. Similarly, users never need to create closures explicitly, instead they use generating block expressions or methods. However, for completeness the type rules for these two constructors are provided:

$$\frac{E \vdash e <: \tau \rightsquigarrow e'}{E \vdash \text{new either } \{\tau; \overline{\tau'}\}(\tau, e) <: \text{either } \{\tau; \overline{\tau'}\} \rightsquigarrow \text{new either } \{\tau; \overline{\tau'}\}(\tau, e')}$$

The following example uses coercion, tuple type, and class construction to build an instance of the Address type:
Address a=new Address(new(new(POBox=4711), City="Atlantis"));
It is illustrated hereinbelow how XML literals in the full Xen language make constructing such values easy.

The typing judgment for member access e.f on expressions simply uses the judgment for generalized member lookup defined earlier:

$$\frac{E \vdash e <: \rightsquigarrow e' \quad \tau.f <: \tau' \rightsquigarrow g}{E \vdash e.f <: \tau' \rightsquigarrow g(e')}$$

Positional access is not lifted; the receiver must be a tuple type:

$$\frac{E \vdash e <: \text{struct } \{\overline{fd_i}\}\tau \rightsquigarrow e' \quad \text{type } (\overline{fd_i}) = \tau}{E \vdash e[i] <: \tau \rightsquigarrow e'[i]}$$

Typing promotable expressions. Promotable block expressions are the sinkholes of all new syntactic forms. Promotable block expressions are translated into closures when their bodies are generators; otherwise, they are translated into elementary block expressions. Typing of block expressions uses a conventional "repmin"-trick to feed the derived type of a statement list back as the required type. The function $\text{sort}(\overline{\tau})$ is used to infer the required type of block expressions and apply-to-all expressions from the derived types. It constructs a discriminated union of all the maximal types (or just the maximal type, if there is just one).

The maximal type of a set of types is their least upper bound, provided it can be reached with identity conversions only. When the block expression is a generator block, i.e., contains a yield statement (which is checked by the yields predicate), the inferred type is a stream of the inferred type. For the expression {yield return 47; yield return "Hello";} the derived types for the block statements will be int, string and hence, the required type of the block will be sequence<either{int; string;)>. Note that Xen's syntactic context condition requires that any expression block must either have yield or return statements.

$$\frac{E, \text{ sequence} < \text{sort}(\overline{\tau}) > \vdash \overline{s} <: \overline{\tau'} \rightsquigarrow \overline{s'} \text{ yields } (\overline{s})}{(\{\overline{s}\}) <: \text{sequence } < \text{sort}(\tau) > \rightsquigarrow \text{new sequence } < \text{sort}(\overline{\tau}) > (\overline{s'})}$$

$$\frac{E, \text{sort}(\overline{\tau}) \vdash \overline{s} <: \overline{\tau} \rightsquigarrow \overline{s'} \neg \text{yields}(\overline{s})}{}$$

The typing of assignment is straightforward:

$$\frac{E \vdash x <: \tau \quad E \vdash e <: \tau' \rightsquigarrow e' \quad \tau <: \tau' \rightsquigarrow f}{E \vdash x = e <: \tau \rightsquigarrow x = f(e)}$$

As for C# and Java, method resolution is based on the static types of the actual arguments and the receiver object. The generalized method invocation judgment defined earlier is used:

$$\frac{E \vdash e <: \tau \rightsquigarrow e' \quad E \vdash \overline{a} <: \tau' \rightsquigarrow \overline{a'} \quad \tau \cdot m(\overline{\tau'}) <: \tau'' \rightsquigarrow f}{E \vdash e \cdot m(\overline{a}) <: \tau'' \rightsquigarrow f(e', \overline{a'})}$$

Apply-to-all blocks on streams are syntactic sugar for a promotable block expression that applies the block to each element of its receiver stream. Note, again, the derived type is passed back as the required type.

$$\frac{\begin{pmatrix} E \vdash e <: \text{ sequence} \langle \tau \rangle \rightsquigarrow e' \quad E[\text{it} \vdash \tau], \\ \text{sequence} < \text{sort } (\overline{\tau}) > \vdash \overline{s'} <: \overline{\tau'} \rightsquigarrow \overline{s'} \end{pmatrix}}{\begin{pmatrix} (E \vdash e.\{\overline{s}\} <: \text{sequence} < \text{sort } (\overline{\tau'}) > \rightsquigarrow \\ (\{\text{foreach } (\tau \text{ it in } e') \text{ yield return } (\{\overline{s'}\});\})) \end{pmatrix}}$$

Typing statements. The empty statement does not contribute anything to the result of a statement block; neither does a nested block:

$$\overline{E, \tau \vdash; <: \text{void} \rightsquigarrow;}$$

$$\frac{E, \tau \vdash \overline{s} <: \overline{\tau'} \rightsquigarrow s'}{E, \tau \vdash \{\overline{s}\} <: \overline{\tau'} \rightsquigarrow \{s'\}}$$

Promotable expressions are executed for their side-effects, and their type is ignored:

$$\frac{E \vdash pe <: \tau' \rightsquigarrow pe'}{E, \tau \vdash pe <: \text{void} \rightsquigarrow pe'}$$

The derived types of the two branches of conditional statements are combined, and the condition must have type bool. The while statement is completely analogous:

$$\frac{E \vdash e <: \text{bool} \rightsquigarrow e' \quad E, \tau \vdash s_1 <: \overline{\tau'} \text{ void} \rightsquigarrow s_1' \quad E, \tau \vdash s_2 <: \overline{\tau''} \text{ void} \rightsquigarrow s_2'}{E, \tau \vdash \text{if } (e) \ s_1 \text{ else } s_2 <: \overline{\tau'}, \overline{\tau''} \rightsquigarrow \text{if } (e') \ s_1' \text{ else } s_2'}$$

$$\frac{E \vdash e <: \text{bool} \rightsquigarrow e' \quad E, \tau \vdash s <: \overline{\tau'} \rightsquigarrow s'}{E, \tau \vdash \text{while } (e)s <: \overline{\tau'} \rightsquigarrow \text{while } (e')s'}$$

The required result type of statements is used in the return and yield statements. The empty return statement can only occur in a void returning context.

$$\overline{E, \text{void} \vdash \text{return}; <: \text{void} \rightsquigarrow \text{return};}$$

If necessary, the derived return type $\tau'$ of a normal return statement is coerced to the required return type $\tau$.

$$\frac{E \vdash e <: \tau' \rightsquigarrow e' \quad \tau' <: \tau \rightsquigarrow f}{E, \tau \vdash \text{return } e; <: \tau' \rightsquigarrow \text{return } f(e')}$$

The return-type of a yield break statement is the null type.

$$\overline{E, \text{sequence} \langle \tau \rangle \vdash \text{yield break}; <: \text{null} \rightsquigarrow \text{yield break};}$$

The required type of a yield return statement is a stream type, and if necessary, the derived return type is upcasted to the required return type. A way of inspecting a stream element is by consuming it in a foreach loop. Otherwise stream elements can never be inspected. The implementation has to distinguish only between stream elements that produce streams and ones that are simple values. Formalization herein uses the type tagging scheme that has been introduced for either values.

$$\frac{E \vdash e <: \tau' \rightsquigarrow e' \quad \tau' \neq \text{sequence} \langle \tau'' \rangle \quad \tau' <: \tau \rightsquigarrow f}{E, \text{ sequence} \langle \tau' \rangle \vdash \text{yield return } e; <: \text{sequence } \langle \tau' \rangle \rightsquigarrow \text{yield return new sequence } \langle \tau' \rangle(\tau, f(e'));}$$

-continued $$\frac{E \vdash e <: \text{sequence}\langle\tau'\rangle \rightsquigarrow e' \text{ sequence }\langle\tau'\rangle}{E, \text{ sequence}\langle\tau\rangle \vdash \text{yield return } e; <: \text{sequence}\langle\tau'\rangle \rightsquigarrow} \quad <: \text{sequence}\langle\tau\rangle \rightsquigarrow f$$
$$\text{yield return new sequence }\langle\tau'\rangle(\text{sequence}\langle\tau'\rangle, f(e'));$$

The last rule uses the equivalence sequence<τ'>≅sequence<sequence<τ'>> for simplification of the inferred return type. This rule also shows that covariance on streams is only applicable when the coercion on the element type is the identity. Thus, sometimes, a nested stream is explicitly copied to "open it for conversion". For example, the following method fails to type-check because the type of the type of ns is not convertible to the required type of the method f:

sequence<int> ns= . . . ;

sequence<object> f( ) {yield return ns;}

The type correct way is to copy the stream ns, such that each element can be implicitly boxed from int to object.

sequence<object> f( ) {yield return ns. {return it;};}

Note the conciseness of the apply-to-all expression to achieve this. Depending on whether the element type of the collection in a foreach statement is a supertype or a subtype of the declared type of the iteration variable, coercion is first applied to a fresh iteration variable y (i.e., y∉dom (E)):

$$\frac{E \vdash e <: \text{sequence}\langle\tau'\rangle \rightsquigarrow e' \quad \tau' <: \tau'' \rightsquigarrow f}{E[x \mapsto \tau''], \tau \vdash s <: \overline{\tau'''} \rightsquigarrow s'}$$
$$\frac{E, \tau \vdash \text{foreach } (\tau''x \text{ in } e)s <: \overline{\tau'''} \rightsquigarrow}{\text{foreach } (\tau'y \text{ in } e')\{\tau''x = f(y); s'\}}$$

$$\frac{E \vdash e <: \text{sequence}\langle\tau'\rangle \rightsquigarrow e' \quad (\tau'')\tau' \rightsquigarrow}{f \quad E[x \mapsto \tau''], \tau \vdash s <: \overline{\tau'''} \rightsquigarrow s'}$$
$$\frac{E, \tau \vdash \text{foreach } (\tau''x \text{ in } e)s <: \overline{\tau'''} \rightsquigarrow}{\text{foreach } (\tau'y \text{ in } e')\{\tau''x = f(y); s'\}}$$

Typing statement lists. Local variable declarations in statement lists are similar to a local variable assignment, but they also extend the environment:

$$\frac{E \vdash e <: \tau' \rightsquigarrow e' \quad \tau' <: \tau'' \rightsquigarrow fE[x \mapsto \tau''], \tau \vdash s <: \overline{\tau'''} \rightsquigarrow \overline{s'}}{E, \tau \vdash \tau''x = e; \overline{s} <: \overline{\tau'''} \rightsquigarrow \tau'' \; x = f(e'); \overline{s'}}$$

In all other cases, the derived types of the statement lists are combined $$\frac{E, \tau \vdash s <: \overline{\tau'} \rightsquigarrow s' \quad E, \tau \vdash ss <: \overline{\tau''} \rightsquigarrow ss'}{E, \tau \vdash s \; ss <: \overline{\tau'}, \overline{\tau''} \rightsquigarrow s' ss'}$$

Typing programs. The rules for typing programs and class declarations are straightforward, and just recursively check/translate all class declarations in a program:

$$\frac{c \rightsquigarrow c' \quad \overline{cd} \rightsquigarrow \overline{cd'}}{\overline{c \; cd} \rightsquigarrow \overline{c' cd'}} \quad c \vdash \overline{md} \rightsquigarrow \overline{md'}$$
$$\overline{\text{class } c : c'\{\tau \overline{md}\} \rightsquigarrow \text{class } c : c'\{\tau \overline{md'}\}}$$

Consider typing method declarations. Normal methods are checked by extending the environment with the types of the formal parameters and the this pointer.

$$\frac{[\text{this } \mapsto c, \overline{x} \mapsto \overline{\tau}], \tau' \vdash \overline{s} <: \overline{\tau''} \rightsquigarrow \overline{s'} \; \neg \text{yields } (\overline{s})}{c \vdash \tau'm(\overline{\tau x})\{\overline{s}\} <: \tau'm(\overline{\tau x})\{\overline{s'};\}}$$

Generator methods, i.e., methods that yield, are translated into ordinary methods that immediately return a promotable block expression that constructs a closure to lazily generate the stream defined by this method.

$$\frac{[\text{this } \mapsto c, \overline{x} \mapsto \overline{\tau}], \text{sequence}\langle\tau'\rangle \vdash \overline{s} <: \overline{\tau''} \rightsquigarrow \overline{s'} \text{ yields } (\overline{s})}{c \vdash \tau' \; m(\overline{\tau x})\{\overline{s}\} \rightsquigarrow \text{sequence}\langle\tau'\rangle \; m(\overline{\tau x})}$$
$$\{\text{return new sequence}\langle\tau'\rangle(\overline{s'});\}$$

Dynamic Semantics

In this section, the dynamics of InnerXen are formalized by defining an operational semantics. This is in the form of a reduction relation, although a 'big-step' evaluation relation can easily be defined. First, the value forms of InnerXen expressions are defined (where bv is the value form of a binding expression):

Expression values v:: = b|i| null    Basic values

| r    Reference

| new ($\overline{bv}$)    Struct value

| new τ(τ', v)    Either value or stream element

Evaluation of InnerXen expressions and statements takes place in the context of a state, which is a pair (H, R), where H is a heap and R is a stack frame. A heap is represented as a finite partial map from references r to runtime objects, and a stack frame is a finite partial map from variable identifiers to values. A runtime object, as for C#, is a pair (τ, cn) where τ is a type and cn is a canonical, which is either a value or a closure. A closure is the runtime representation of a stream and is written as a pair (R, $\overline{s}$) where R is a stack frame and $\overline{s}$ is a statement sequence.

In what follows, it is assumed that expressions and statements are well-typed. As has been mentioned before, the extensive use of coercions means that a number of expression and statement forms do not appear in their full generality at runtime.

For purposes of brevity, only the key reduction steps are described. Evaluation contexts, written E[ ], are used to encode the evaluation strategy in the now familiar way. The definition is omitted. The key feature is that an InnerXen expression (and also for statements) is either a value or can be uniquely decomposed to the form E[e].

Reduction of expressions. The reduction relation for InnerXen expressions is written S, e→S', e' which means that given a state S, expression e reduces by one or possibly more steps to e' and a (possibly updated) state S". (An auxiliary function value is used, and defined as follows:

$$\text{value}(f - v) \stackrel{def}{=} v, \text{value}(v) \stackrel{def}{=} v.)$$

$$\overline{(H, R), x \to (H, R), R(x)}$$

$$\frac{H(r) = (c, cn)}{(H, R), r.\text{content} \to (H, R), cn}$$

$$\frac{0 \leq i \leq n}{S, \text{new } (bv_0, \ldots, bv_n)[i] \to S, \text{value } (bv_i)}$$

$$\frac{H(r) = (\tau', cn)\tau' <: \tau}{(H, R), r \text{ is } \tau \to (H, R), \text{true}}$$

$$\frac{H(r) = (\tau', cn)\tau' \not<: \tau}{(H, R), r \text{ is } \tau \to (H, R), \text{false}}$$

$$\overline{S, \text{new } \tau'(\tau, v) \text{ was } \tau \to S, \text{true}}$$

$$\frac{\tau \neq \tau''}{S, \text{new } \tau'(\tau, v) \text{ was } \tau'' \to S, \text{false}}$$

$$\overline{S, \text{new } \tau'(\tau, v) \cdot \text{value} \to S, v}$$

$$\frac{H(r) = (\tau', cn)\tau <: \tau'}{(H, R), (\tau)r \to (H, R), r}$$

Two rules for creating runtime objects are given below. The first creates a simple boxed object, places it on the heap (at a fresh location) and returns the heap reference. The second is similar but creates a closure to be placed on the heap.

$$\frac{r \notin dom(H)}{(H, R), \text{new } \tau(v) \to (H[r \mapsto (\tau, v)], R), r}$$

$$\frac{r \notin dom(H)}{(H, R), \text{new } \tau(\bar{s}) \to (H[r \mapsto (\tau, (R, \bar{s}))], R), r}$$

Reduction of promotable expressions. Evaluating an assignment simply updates the stack frame:

$$\overline{(H,R),x=v \to (H,R[[x \mapsto v]]),v}$$

Evaluating a method call first extracts the appropriate method body, then creates a new stack frame consisting of the local bindings of the parameters to the corresponding arguments, and finally, evaluates the body. Symbolically, $\to^*$ means the reflexive, transitive closure of $\to$.

$$\frac{H(r) = (c, \_) \text{ method}(m, c) = \tau'(\overline{\tau\,x})\{\bar{s}\}}{(H, []), \{c \text{ this} = r; \overline{\tau\,x = v}; \bar{s}\} \to *(H', R'), \text{return } v', \bar{s'}}$$
$$\overline{(H, R), r \cdot m(\bar{v}) \to (H', R'), v'}$$

Stream generating block expressions are translated to closures; non-generating block expressions evaluate the statement sequence in the current frame.

$$\frac{(H, R), \bar{s} \to *(H', R'), \text{return } v, \bar{s'}}{(H, R), (\{\bar{s}\}) \to (H', R'), v}$$

For void methods and block expressions that return void, two further rules are provided. The statement sequence $\bar{s}$ has been exhausted or statement execution of $\bar{s}$ is interrupted by a return; statement. In both cases, the pseudo-value void is returned as the result. The type system guarantees that this result is never inspected and the operational semantics guarantees that it is immediately discarded. For purposes of brevity these rules are not provided. However, the rules for foreach are similar in spirit.

As for Java, there are a number of known error configurations. ERR denotes the set of predictable errors. One member of this set is NullX, which is generated by the following rules. Other error states can be created.

$$\overline{S, \text{null}.m(\bar{v}) \to S, \text{NullX}}$$

$$\overline{S, \text{null}.\text{content} \to S, \text{NullX}}$$

Reduction of statements. A statement value is of the form ';', return;, return v;, yield break; or yield return v. The reduction relation for statements (resp. statement lists) is written S, s→S', s' (resp. S, $\bar{s}$→S', $\bar{s'}$). The rules for if, while, promotable expressions, updates of local variables and blocks are standard:

$$\overline{S, \text{if}(\text{true})s_1\text{elses}_2 \to S, s_1}$$

$$\overline{S, \text{if}(\text{false})s_1\text{elses}_2 \to S, s_2}$$

$$\overline{S, \text{while}(e)\{\bar{s}\} \to S, \text{if}(e)\{\bar{s}\text{while}(e)\{\bar{s}\}\}\text{else}\{;\}}$$

$$\overline{(H,R),\tau x = v \to (H,R[x \mapsto v]),;}$$

$$\overline{S, \{\bar{s}\} \to S, \bar{s}}$$

$$\overline{S, v \to S,;}$$

The rules for foreach effectively perform a lazy depth-first traversal over the n-ary tree produced by the stream generators. If the stream is null the iteration stops.

$$\overline{S, \text{foreach}(\tau\,x\,\text{in}\,\text{null})s \to S,;}$$

When the stream is not null, every iteration forces the evaluation of part of the stream as follows. First, a new evaluation context is created with the closure's frame as the current frame and the closure statements as its body. Next, the body is evaluated until it cannot be reduced any further. Then a case distinction is made. If the computation producing the stream is empty, or if the computation producing the stream breaks the foreach loop is equivalent to skip.

$$\frac{H(r) = (\tau', (R', \bar{s'})) \quad (H, R'), \bar{s'} \to *(H', R''),;}{(H, R), \text{foreach}(\tau\,x\,\text{in}\,r)s \to (H'[r \mapsto (\tau, (R'',;))], R),;}$$

$$\frac{H(r) = (\tau', (R', \bar{s'})) \quad (H, R'), \bar{s'} \to *(H', R''), \text{yield break}; \bar{s''}}{(H, R), \text{foreach}(\tau\,x\,\text{in}\,r)s \to (H'[r \mapsto (\tau, (R'',;))], R),;}$$

In any case, the side-effect of the evaluation are recorded in the closure, otherwise other references could not observe that the stream has been partially evaluated. If the computation evaluates to a yield return statement the following case distinction is made. If the element type is a reference type, and the value v is null, the computation continues and the null reference (e.g., the empty stream) is dropped.

$$H(r) = (\tau', (R', \bar{s'}))$$
$$(H, R'), \bar{s'} \to *(H', R''),$$
$$\frac{\text{yield return new sequence} < \rho' > (\rho, \text{null}); \bar{s''}}{(H, R), \text{foreach}(\tau\,x\,\text{in}\,r)s \to}$$
$$(H'[r \mapsto (\tau', (R'', \bar{s''}))], R), \text{foreach}(\tau\,x\,\text{in}\,r)s$$

If the element type is not a stream and the value v is not null, the value v is the next stream element to be returned; as a consequence, v is bound to the iteration variable and the foreach loop is unrolled once.

$$H(r) = (\tau', (R', \overline{s'}))$$

$$(H, R'), \overline{s'} \to *(H', R''),$$

$$\frac{\text{yield return new sequence} < \tau'' > (\tau'', v); \overline{s''} v \neq \text{null}}{(H, R), \text{foreach}(\tau \ x \ \text{in} \ r)s \to}$$

$$(H'[r \to (\tau', (R'', \overline{s''}))], R), \{\tau \ x \ \text{in} \ v; s\}; \text{foreach}(\tau \ x \ \text{in} \ r)s$$

If the element type is a nested stream, the value is evaluated first (first foreach loop) and only then evaluation continues (second foreach loop). This unfolding of the nested stream is the essence of lazy flattening.

$$H(r) = (\tau', (R', \overline{s'}))$$

$$(H, R'), \overline{s'} \to *(H', R''),$$

$$\frac{\text{yield return new sequence} < \tau'' > (\text{sequence} < \tau'' >, v); \overline{s''}}{(H, R), \text{foreach}(\tau \ x \ \text{in} \ r)s \to}$$

$$(H'[r \to (\tau', (R'', \overline{s''}))], R), \{\text{foreach} \ (\tau \ x \ \text{in} \ v)s\}; \text{foreach}(\tau \ x \ \text{in} \ r)s$$

Executing a program simply executes the designated entry-point method body.

Extensions to InnerXen

In this section, further details of features of the full Xen language are described. One feature is updating, which could be considered part of the core of Xen.

XML literals. The full Xen language supports XML literals as syntactic sugar for serialized object graphs. For example, an instance can be created of the Address type from the introduction using the following literal:

Address a=<Address>
<Street>13 Elm St</Street><City>Hollywood</City>
</Address>;

The Xen compiler contains a validating XML parser that deserializes the above literal into normal constructor calls.

XML literals can also contain typed holes, much as in XQuery, that allows embedding of expressions to compute part of the literal. This is especially convenient for generating streams. This requires a more complicated form of subtyping for the validator.

Path expressions and comprehensions. The full Xen language adds several more powerful query expressions to those already described. For instance, filter expressions e[e] are syntactic sugar for the following apply-to-all expression: e. {if (e') yield return it;}. Wildcard selection e.* enumerates all top-level members of a struct and is syntactic sugar for the expression ({yieldreturnite[i];}).

Since labels can be duplicated in tuple types and discriminated unions, the full language also allows type-based selection. For example, given the earlier example tuple type struct{int a; struct {string a;};} x the string member a can be selected by writing x.string: :m.

Transitive queries are also supported in the full Xen language: the expression e . . . τ: :m selects all members m of type τ that are transitively reachable from e. Transitive queries are inspired by the XPath descendant axis.

In addition to path-like queries, the full Xen language also supports comprehensions using SQL select expressions. Comprehensions are convenient when joining data from different sources. For example, one of the XQuery use-cases asks to list the title prices for each book that is sold by both booksellers A and BN. Using a select statement and XML-literals, this query can be written in full Xen as follows:

A-BN=
  select
   <book-with-prices>
    <title>{a.title}</title>
    <price-A>{a.price}</price-A><price-BN>{bn.price)</price-BN>
   </book-with-prices>
  from book a in A.book, book bn in BN.book
  where a.title=bn.title;

Note the use of XML placeholders {a.title} and {bn.price}: when this code is evaluated new titles and new prices are computed from the bindings of the select-from-where clause.

Updates. So far it has been shown how to query values using generalized member access, but as Xen is an imperative language, one would expect to be able to perform updates on values as well. Properly formalizing the notion of updates on semi-structured data using path-expressions however, is not completely trivial.

Updates on tuple types are relatively straight forward, but care needs to be taken of the fact that labels can be duplicated. For example, the assignment x.a=y below struct{int a; struct{string a;};} x;

struct{int; string a;} y=new(47,"11");

x.a=y;

needs to be broken into several smaller assignments to each individual occurrence of member a as in the block expression below:

({x[0]=y[0]; x[1] [0]=y[1]; return y; })

It is less clear how and if updates have to be lifted over streams. For example, given a stream bs of type sequence<Button>, should the rhs of the lifted update bs.Text=ts be a stream of which each element is then assigned to the corresponding element of the stream or a single value that is assigned to each of the elements in the stream. Since no choice is obviously better, it is left to the programmer and not lift updates over streams.

Updates can be defined on discriminated unions. For example, given the variable x of type either {string; Person; int;} where type Person has a field Age, the expression x.Age=40 can be used to update the Age field of x. If x contains a string or an int, then the update has no effect.

To formalize properly updates, one needs to distinguish between l-values and r-values.

All groups. Consider an ordinary class such as Point that has normal fields instead of a single content type.

class Point {int x; int y;}

Fields of ordinary classes are modeled using intersection types or XSD all groups. That is, the class Point below is shorthand for the following content class class Point {all{int x; int y;}}

Whereas discriminated unions either$\{\overline{\tau}\}$ could be considered as type-indexed sums with the guarantee that e was $\overline{\tau}$ is true for exactly one of the types $\overline{\tau}$ in $\overline{\tau}$, all groups all $\{\overline{\tau}\}$ can be considered as type-indexed records where the invariant is that e was $\overline{\tau}$ is true for all types $\tau$ in $\overline{\tau}$. For values e of type all $\{\overline{\tau"}\}$, the special member e.τ retrieves the member of type $\overline{\tau}$ from the all group.

Besides for modeling normal classes, all groups can also be used to formalize the notion of method groups that are informally used in the C# and Java language specifications. All groups are interesting by themselves as a program structuring principle.

Summary

The problem of manipulating relational and semi-structured data within common object-oriented languages have been described. A series of elegant extensions to C# are described that provide type-safe, first-class access to these forms of data. A core language, called InnerXen, has been described and have formalized both its type system and operational semantics.

In another implementation of the disclosed Xen/InnerXen language, it is within contemplation of the present invention that a Xen compiler can be been built that implements a superset of the InnerXen fragment described herein. For example, a richer set of implicit conversions (e.g., unrestricted covariance for streams and tuple types) and a richer set of type including first class functions and intersection types can be considered. Moreover, Xen can be combined with the polyphonic extensions to C#.

Figure 13:
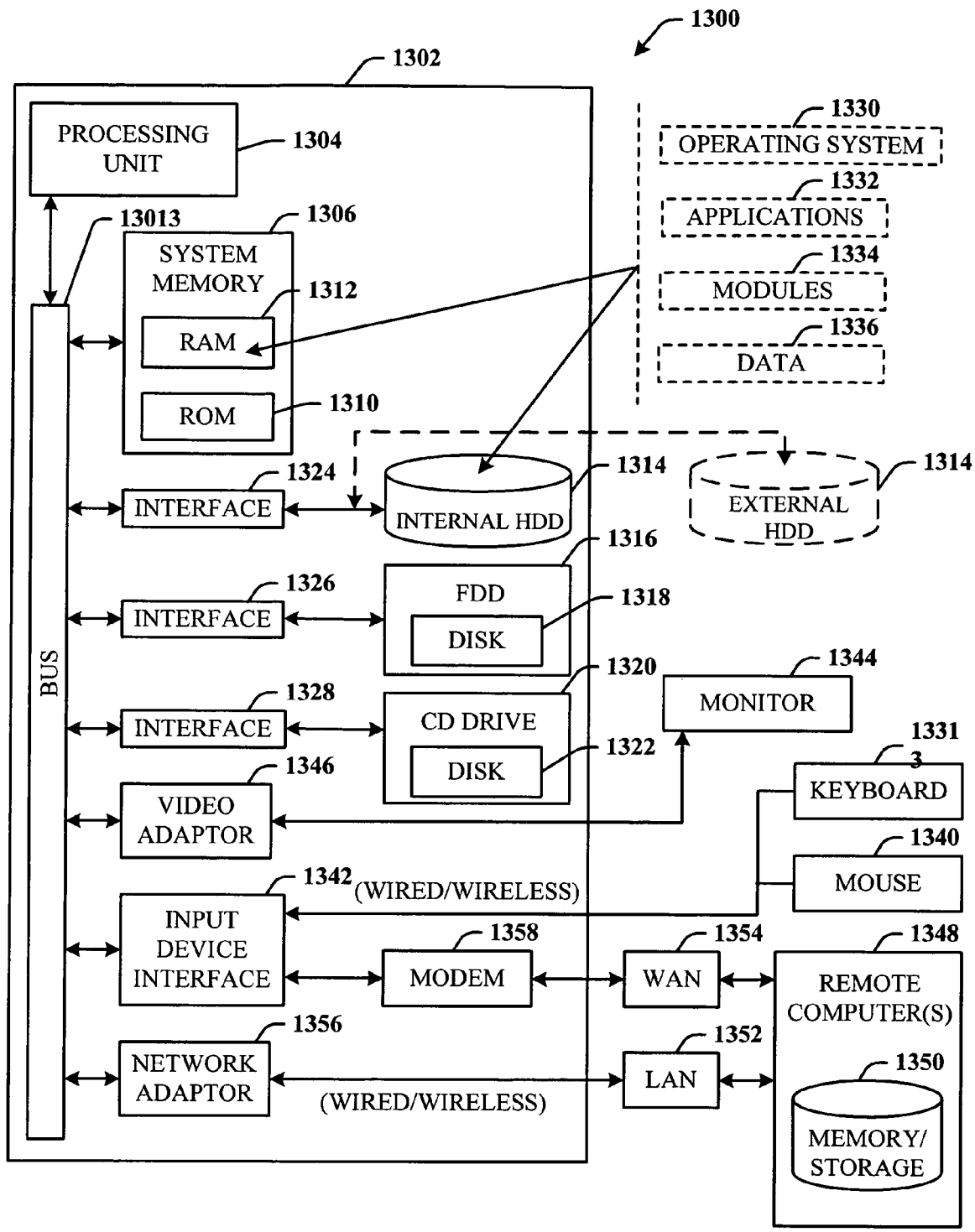
FIG. 13 illustrates a block diagram of a computer operable to execute the disclosed architecture.

Referring now to FIG. 13, there is illustrated a block diagram of a computer operable to execute the disclosed architecture. In order to provide additional context for various aspects of the present invention, FIG. 13 and the following discussion are intended to provide a brief, general description of a suitable computing environment 1300 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, there is illustrated an exemplary environment 1300 for implementing various aspects of the invention that includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312.

It is appreciated that the present invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356. When used in a WAN networking environment, the computer 1302 can include a modem 1358, or is connected to a communications server on the LAN, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

Figure 14:
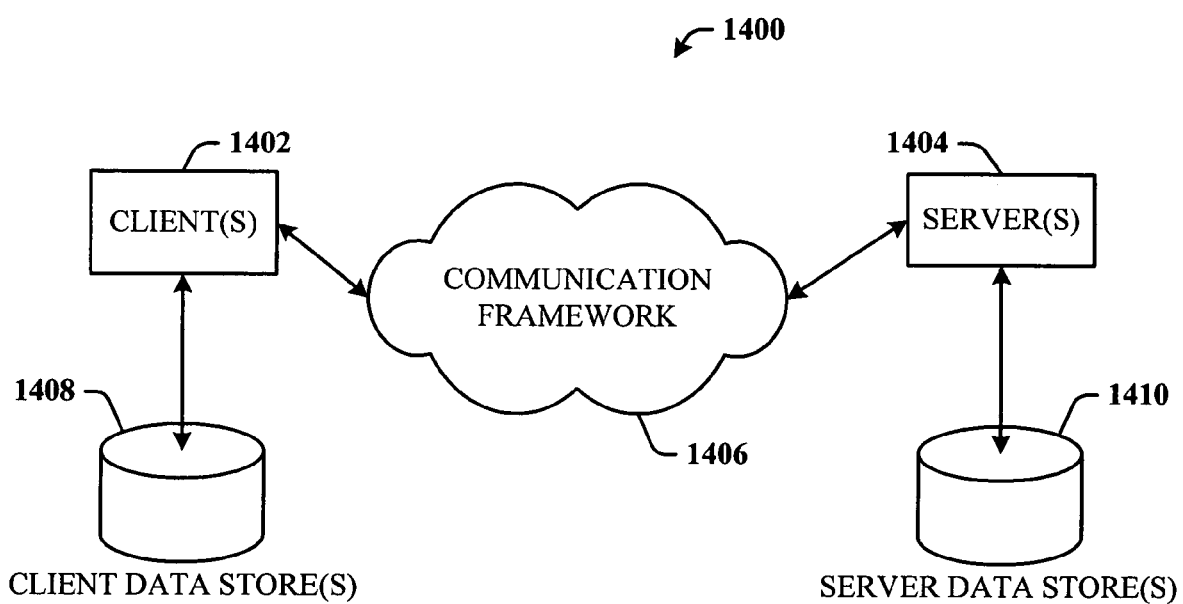
FIG. 14 illustrates a schematic block diagram of an exemplary computing environment in accordance with the present invention.

Referring now to FIG. 14, there is illustrated a schematic block diagram of an exemplary computing environment 1400 in accordance with the present invention. The system 1400 includes one or more client(s) 1402. The client(s) 1402 can be hardware and/or software (e.g., threads, processes, computing devices). The client(s) 1402 can house cookie(s) and/or associated contextual information by employing the present invention, for example. The system 1400 also includes one or more server(s) 1404. The server(s) 1404 can also be hardware and/or software (e.g., threads, processes, computing devices). The servers 1404 can house threads to perform transformations by employing the present invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system for providing seamless integration of data access in an object-oriented host language by using a type system that implements a set of syntactic constructions that extend the object-oriented paradigm to encompass semi-structured and relational data, the system comprising:

a processor; and memory storing a data access component that comprises a type system and a plurality of syntactic constructions,
wherein a first syntactic construction of the plurality of syntactic constructions is a tuple type comprising a heterogeneous ordered finite collection of members, wherein at least one of the members is a struct, and wherein the type system provides type directed lifting of member access such that members of the struct are accessed as if they were direct members of the tuple type,
wherein a second syntactic construction of the plurality of syntactic constructions is an either type that may be either of a plurality of members having different types, wherein the type system resolves a request to access the either type by performing lifted member access on the either type such that any member of the plurality of members for which the request resolves to a non-null value is returned, and the either type such that any member of the plurality of members for which the request resolves to a non-null value is returned, and wherein a third syntactic construction of the plurality of syntactic constructions is a content class comprising a class that has a single unlabeled type that describes the content of the class.

2. The system of claim 1 wherein the type directed lifting of member access is performed by using a static type of the tuple type to determine how to access the members of the struct that are accessed as if they were direct members of the tuple type.

3. The system of claim 1 wherein the tuple type is covariant only if the corresponding conversion on the members of the tuple type is an identity conversion.

4. The system of claim 1 wherein the tuple type includes one or more unlabeled members.

5. The system of claim 4 wherein the unlabeled members are accessed by their position in the tuple type.

6. The system of claim 1 wherein the tuple type includes two or more members having the same member name such that upon receiving a request to access a member of the tuple type having the same name, the type system returns a new tuple type comprised of each of the two or more members having the same name.

7. The system of claim 1 wherein a fourth syntactic construction of the plurality of syntactic constructions is a stream type comprising a stream of types, wherein the type system provides type directed lifting of member access to each type in the stream.

8. The system of claim 1 wherein the type system is one of C# or Java.

9. A computer readable medium storing a data access component that, when executed by a processor, provides seamless integration of data access in an object-oriented host language by using a type system that implements a set of syntactic constructions that extend the object-oriented paradigm to encompass semi-structured and relational data, the a data access component comprising:

a type system and a plurality of syntactic constructions, wherein a first syntactic construction of the plurality of syntactic constructions is a tuple type comprising a heterogeneous ordered finite collection of members, wherein at least one of the members is a struct, and wherein the type system provides type directed lifting of member access such that members of the struct are accessed as if they were direct members of the tuple type, wherein a second syntactic construction of the plurality of syntactic constructions is an either type that may be either of a plurality of members having different types, wherein the type system resolves a request to access the either type by performing lifted member access on the either type such that any member of the plurality of members for which the request resolves to a non-null value is returned, and wherein a third syntactic construction of the plurality of syntactic constructions is a content class comprising a class that has a single unlabeled type that describes the content of the class.

10. The computer readable medium of claim 9 wherein the type directed lifting of member access is performed by using a static type of the tuple type to determine how to access the members of the struct that are accessed as if they were direct members of the tuple type.

11. The computer readable medium of claim 9 wherein the tuple type is covariant only if the corresponding conversion on the members of the tuple type is an identity conversion.

12. The computer readable medium of claim 9 wherein the tuple type includes one or more unlabeled members.

13. The computer readable medium of claim 12 wherein the unlabeled members are accessed by their position in the tuple type.

14. The computer readable medium of claim 9 wherein the tuple type includes two or more members having the same member name such that upon receiving a request to access a member of the tuple type having the same name, the type system returns a new tuple type comprised of each of the two or more members having the same name.

15. The computer readable medium of claim 9 wherein a fourth syntactic construction of the plurality of syntactic constructions is a stream type comprising a stream of types, wherein the type system provides type directed lifting of member access to each type in the stream.

16. The computer readable medium of claim 9 wherein the type system is one of C# or Java.

17. A method performed by a processor of a computer system for resolving a request to access types in a type system comprising:

receiving a first request, at the processor, to access a member of a tuple type that includes a struct and at least one other member, wherein the first request is of the format <tuple type name>.<member name> such that the first request is for a direct member of the tuple type;

determining, by the processor, that the first request is for a member of the struct rather than for a direct member of the tuple type by accessing a static type of the tuple type and determining the requested member name is the name of a member of the struct;

returning, by the processor, the member of the struct having the member name as specified in the first request; and receiving a second request to access an either type that may be either of a plurality of members having different types, and resolving the second request by performing lifted member access on the either type such that any member of the plurality of members for which the second request resolves to a non-null value is returned;

wherein the type system also includes a content class syntactic construction comprising a class that has a single unlabeled type that describes the content of the class.

18. The method of claim 17 wherein the at least one other member of the tuple type is a second struct that also includes a member having the member name as specified in the first request, the method further comprising:

returning a new tuple type that includes the members of both structs having the member name as specified in the first request.

* * * * *

UNITED STATES PATENT AND TRADEMARK OFFICE
CERTIFICATE OF CORRECTION

| | | |
|---|---|---|
| PATENT NO. | : 7,774,376 B1 | |
| APPLICATION NO. | : 10/909060 | |
| DATED | : August 10, 2010 | |
| INVENTOR(S) | : Henricus Johannes Maria Meijer et al. | |

It is certified that error appears in the above-identified patent and that said Letters Patent is hereby corrected as shown below:

In column 37, line 44, in Claim 9, after "the" delete "a".

Signed and Sealed this
Fifth Day of April, 2011

David J. Kappos
*Director of the United States Patent and Trademark Office*